US012795499B2

(12) United States Patent
Kairali et al.

(10) Patent No.: US 12,795,499 B2
(45) Date of Patent: Nov. 10, 2026

(54) INTELLIGENT SERVICE MESH DATA COMPRESSION

(71) Applicant: International Business Machines Corporation, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 17/568,916

(22) Filed: Jan. 5, 2022

(65) Prior Publication Data

US 2023/0217343 A1 Jul. 6, 2023

(51) Int. Cl.

| | |
|---|---|
| ***H04W 40/04*** | (2009.01) |
| ***H04W 40/02*** | (2009.01) |
| ***H04W 40/20*** | (2009.01) |
| ***H04W 64/00*** | (2009.01) |
| ***H04W 84/18*** | (2009.01) |

(52) U.S. Cl.
CPC ......... *H04W 40/04* (2013.01); *H04W 40/026* (2013.01); *H04W 40/20* (2013.01); *H04W 64/003* (2013.01); *H04W 84/18* (2013.01)

(58) Field of Classification Search
None
See application file for complete search history.

(56) References Cited

U.S. PATENT DOCUMENTS 7,319,667 B1 * 1/2008 Biederman ............. H04L 47/10 370/230.1
10,516,764 B1 * 12/2019 Tribble ................... H03M 7/30
10,637,938 B2 * 4/2020 Lawson ................ H04L 67/565
10,951,717 B2 * 3/2021 Nainar .................. H04L 45/302
(Continued)

FOREIGN PATENT DOCUMENTS

WO 2023/131232 A1 7/2023

OTHER PUBLICATIONS

International Search Report and Written Opinion, International Application No. PCT/CN2023/070674, International Filing Date Jan. 5, 2023.
(Continued)

*Primary Examiner* — Suk Jin Kang
(74) *Attorney, Agent, or Firm* — Stosch Sabo

(57) ABSTRACT

Intelligent compression of data through a service mesh depending on size and frequency of existing service-to-service communications, relative workloads of the individual microservices, and time of day when large amounts of aggregate network traffic is expected to occur. Compression is enabled on a selective basis, based on user profiles, the size of data being transmitted and/or compression is applied broadly for all data being routed when aggregated amounts of network traffic exceeds threshold levels at particular times of day. Friendly Neighbor Compression Protocol enables data routing through trusted microservices of the service mesh having the same or similar standard and/or security requirements as the microservices of the microservice chain.
(Continued)

When computing resources of microservice chains are limited or scarce, service mesh routes data from the microservice chain to trusted microservices for data compression, then re-routes the compressed data to the next microservice of the microservice chain.

14 Claims, 13 Drawing Sheets

(56) References Cited

U.S. PATENT DOCUMENTS

| | | | | |
|---|---|---|---|---|
| 10,963,324 | B2 * | 3/2021 | Acosta | G06F 16/245 |
| 11,019,159 | B2 * | 5/2021 | Lawson | H04M 15/44 |
| 11,032,160 | B1 * | 6/2021 | Raheja | H04L 41/0843 |
| 11,349,909 | B2 * | 5/2022 | Hulick, Jr. | H04L 67/34 |
| 11,429,464 | B2 * | 8/2022 | Raheja | G06F 9/547 |
| 11,457,080 | B1 * | 9/2022 | Meduri | H04L 67/60 |
| 11,544,752 | B2 * | 1/2023 | Lawson | H04L 12/1403 |
| 11,582,589 | B2 * | 2/2023 | Taft | H04W 24/02 |
| 11,677,650 | B2 * | 6/2023 | Parla | H04L 67/1023 709/224 |
| 12,003,546 | B1 * | 6/2024 | Quiros | H04L 63/1425 |
| 12,177,304 | B2 * | 12/2024 | Lawson | H04M 15/62 |
| 2017/0187785 | A1 * | 6/2017 | Johnson | H04L 51/42 |
| 2019/0123970 | A1 | 4/2019 | Rastogi | |
| 2020/0120168 | A1 * | 4/2020 | Nainar | H04L 45/30 |
| 2020/0133789 | A1 * | 4/2020 | Natanzon | G06F 16/2365 |
| 2020/0177549 | A1 * | 6/2020 | Barton | H04L 63/1441 |
| 2020/0192732 | A1 * | 6/2020 | Acosta | G06F 9/546 |
| 2020/0301760 | A1 * | 9/2020 | Janakiraman | G06Q 50/40 |
| 2021/0117242 | A1 * | 4/2021 | Van De Groenendaal | H04L 67/1001 |
| 2021/0135983 | A1 * | 5/2021 | Farnham | H04L 45/306 |
| 2021/0173730 | A1 * | 6/2021 | Acosta | G06F 9/54 |
| 2021/0243247 | A1 * | 8/2021 | He | H04L 41/5054 |
| 2021/0311655 | A1 | 10/2021 | Benjamin | |
| 2021/0344549 | A1 * | 11/2021 | Babington | H03M 7/6082 |
| 2021/0392477 | A1 * | 12/2021 | Taft | H04W 24/02 |
| 2021/0400021 | A1 * | 12/2021 | Barton | H04L 63/1441 |
| 2022/0006854 | A1 * | 1/2022 | Hulick, Jr. | G06N 20/00 |
| 2022/0012095 | A1 * | 1/2022 | Ylinen | G06F 9/4843 |
| 2022/0035689 | A1 * | 2/2022 | Raheja | G06F 9/5011 |
| 2022/0070250 | A1 * | 3/2022 | Baid | G06F 9/5072 |
| 2022/0070279 | A1 * | 3/2022 | Pang | H04L 67/133 |
| 2022/0100566 | A1 * | 3/2022 | Ylinen | G06F 9/5088 |
| 2022/0147423 | A1 * | 5/2022 | Natanzon | G06F 11/1464 |
| 2022/0224535 | A1 * | 7/2022 | Coffing | H04L 63/205 |
| 2022/0225065 | A1 * | 7/2022 | Doken | H04L 41/5051 |
| 2022/0291973 | A1 * | 9/2022 | Wangde | G06F 9/5055 |
| 2023/0047880 | A1 * | 2/2023 | Lenrow | H04L 41/0893 |
| 2023/0179967 | A1 * | 6/2023 | Taft | H04L 63/1408 726/1 |
| 2023/0325246 | A1 * | 10/2023 | Guim Bernat | G06F 11/3006 718/104 |
| 2024/0007414 | A1 * | 1/2024 | Jain | G06F 9/5088 |
| 2024/0111747 | A1 * | 4/2024 | Maitra | G06F 16/27 |
| 2024/0241715 | A1 * | 7/2024 | Shpilyuck | G06F 8/65 |
| 2025/0021446 | A1 * | 1/2025 | Av | G06F 11/1451 |

OTHER PUBLICATIONS

"Inter-node and CLI Traffic Compression", RabbitMQ, downloaded from the internet on Sep. 2, 2021, 4 pages, <https://www.rabbitmq.com/clustering-compression.html>.

Boone, Keith W., "Optimizing Inter-Microservice Communications using GZip Compression in HAPI on FHIR", Healthcare Standards, Jul. 13, 2019, 6 pages, <http://motorcycleguy.blogspot.com/2019/07/optimizing-inter-microservice.html>.

Indrasiri, Kasun, "The Potential for Using a Service Mesh for Event-Driven Messaging", InfoQ, downloaded from the internet on Sep. 2, 2021, 8 pages, <https://www.infoq.com/articles/service-mesh-event-driven-messaging/>.

Mell et al., "The NIST Definition of Cloud Computing", Recommendations of the National Institute of Standards and Technology, Special Publication 800-145, Sep. 2011, 7 pages.

* cited by examiner

INTELLIGENT SERVICE MESH DATA COMPRESSION

BACKGROUND

The present disclosure relates generally to the field of microservice architecture, and more specifically to service meshes, communication between microservices and intelligent compression of data routed through microservice chains by the service mesh.

A service mesh provides a way to control how different parts of an application share data with one another. The service mesh is a dedicated infrastructure layer built right into an application. This visible infrastructure layer can document how well different parts of an application interact with one another, making it easier to optimize communication and avoid downtime as an application grows and changes over time. Each part of the application is called a "service," and the services rely on other services to complete transactions, tasks or other functions requested by users. Modern applications are often broken down into this microservice architecture, whereby a network of services each perform a specific business function. In order to execute its function, one service might need to request data from several other services. The service mesh routes requests from one service to the next, optimizing how all the moving parts of the network of microservices work together. For cloud-native applications built in a microservices architecture, a service mesh is a way to comprise many discrete services into a functional application. The service mesh takes the logic governing service-to-service communication out of individual services and abstracts it to a layer of infrastructure. A microservices architecture lets developers make changes to an application's services without the need for a full redeploy. Unlike application development in other architectures, individual microservices can be built by small teams with the flexibility to choose their own tools and coding languages. Microservices are built independently, communicate with each other, and can individually fail without escalating into an application-wide outage.

SUMMARY

Embodiments of the present disclosure relate to a computer-implemented method, an associated computer system and computer program products for intelligently compressing data routed through a service mesh using a Friendly Neighbor Compression protocol. The computer-implemented method comprises collecting, by the service mesh, service mesh metrics into a database that is tracking microservices of the service mesh being used for each call, and a size of data sent between microservices of one or more microservice chains, for each user profile submitting application programming interface (API) calls to the service mesh; performing, by the service mesh, a resource trend analysis of a first microservice chain using the database to identify resource availability of the microservices within the first microservice chain configured to compress data being routed by the service mesh in response to an incoming API call; predicting, by the service mesh, resource constraints of a first microservice within the first microservice chain based on the resource trend analysis; searching, by the service mesh, for a second microservice that resides outside of the first microservice chain, wherein the second microservice is within a same network or namespace as the first microservice chain, and the second microservice has freely available resources to compress the data routed by the service mesh in response to the incoming API call; and routing, by the service mesh, uncompressed data of the incoming API call through the first microservice to the second microservice.

Embodiments of the present disclosure also relate to a computer-implemented method, an associated computer system and computer program products for intelligently compressing data routed through a service mesh based on type of usage, user profile specific routing and/or aggregated network traffic during periods of time. The computer-implemented method comprising collecting, by the service mesh, service mesh metrics into a database that is tracking microservices of the service mesh being used for each application programming interface (API) call, size of data sent between microservices of one or more microservice chains for each user profile submitting API calls to the service mesh, and a period of time each API call is performed by the service mesh routing data through the microservices of the service mesh; configuring, by the service mesh, a threshold for compressing data routed between microservices of the service mesh, wherein the threshold is configured as a function of historical metrics of the database for each user profile and each microservice of the service mesh; receiving, by the service mesh, an API call requesting transmission of data to a microservice of the service mesh via a microservice chain; identifying, by the service mesh, whether the transmission of the data to the microservice via the microservice chain triggers the threshold for compressing data; upon triggering the threshold for compressing data, compressing, by the service mesh, the data at a first microservice of the microservice chain; and routing, by the service mesh, data compressed by the first microservice of the microservice chain to a second microservice of the microservice chain.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1A:
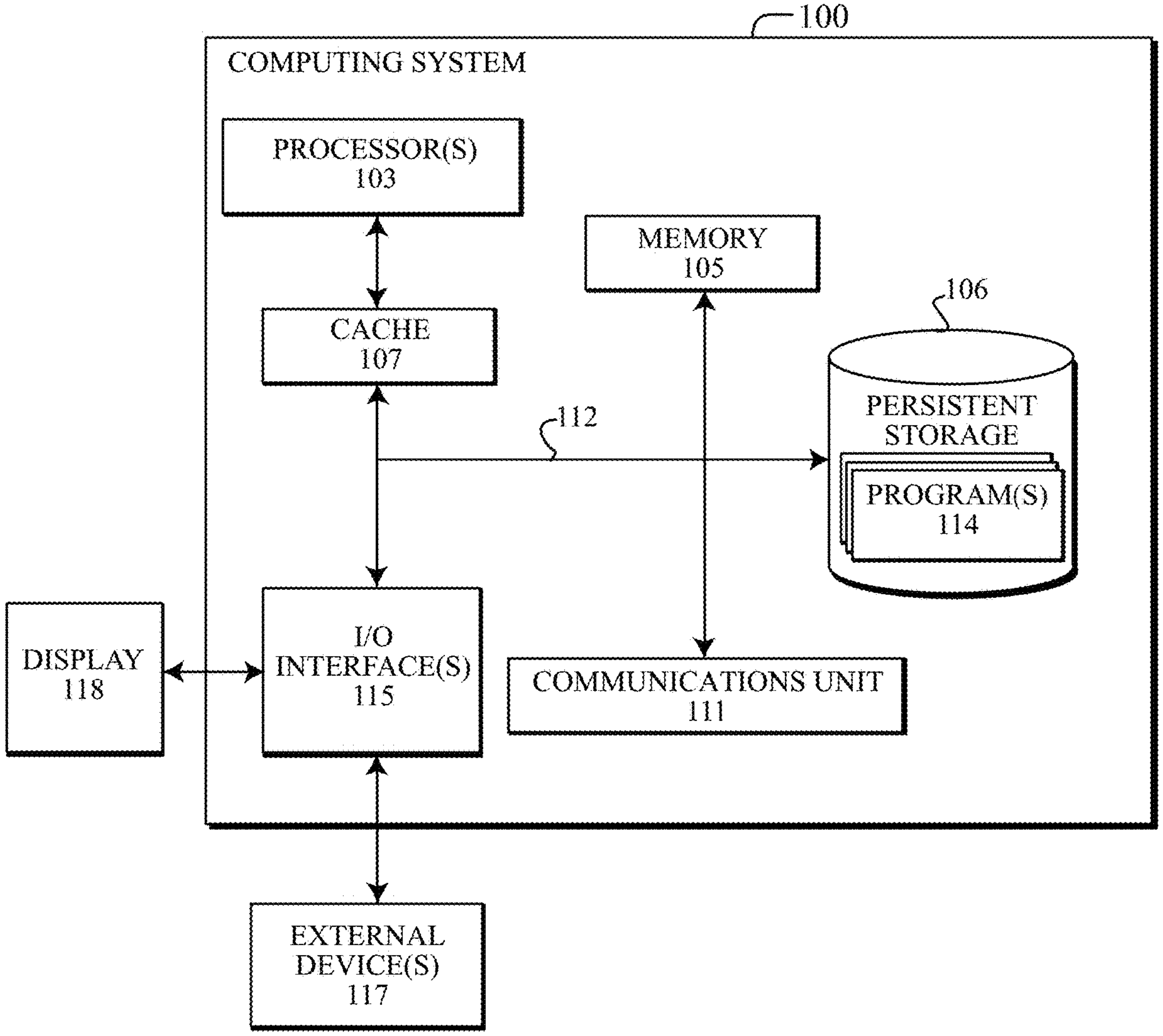
FIG. 1A depicts a block diagram illustrating internal and external components of an embodiment of a computing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

As computing environments delivering computing services to customers transition from legacy architectures to a microservice architecture, many new challenges have arisen because of the changes in how services are delivered to customers. Large amounts of datasets and learning data are transferred between the many different services of the cloud-based environments. When the amount of data being transferred between services reach certain sizes, compression can be implemented to help reduce and/or minimize bloating on the network. In currently available microservice architectures, microservices can communicate through a service mesh comprising a plurality of microservices conducting service-to-service communication. However, as the service mesh experiences large dataset transmission or frequent dataset transmission, that may be re-occurring between microservices of the network, compression of the data is applied indiscriminately across all services. Current service mesh networks do no not apply the compression intelligently based on the users, expected network traffic and/or availability of resources using alternative data routing rules. The one-size fits all compression approach can result in a problem wherein compression may be occurring where compressing the data may not be necessary. For example, compression of data may be applied to all microservices the same, including the application of compression where data is sent using highly trafficked microservices, microservices with less traffic, microservices with less available resources and microservices with plenty of spare computing resources.

Embodiments of the present disclosure recognize that the need for data compression for service-to-service communications within a service mesh may vary based on a plurality of factors. For example, usage by individual users or user profiles, usage patterns, the time of day and the overall aggregate amount of network traffic. Compression of data within the service mesh may vary depending on the size and frequency of existing service-to-service communications being requested by users, the relative workloads of the individual services, and the times of day when high network traffic is expected to occur. Embodiments of the present disclosure may leverage cognitive computing and analysis of historical service mesh metrics collected by the service mesh to intelligently apply compression on a selective basis, as needed. Selective applications of data compression may be applied based on the user profile transmitting data, the aggregated amount of network traffic when requests are predicted to be made, the time of day and the workloads being run by the services of the service mesh.

In some situations, a Friendly Neighbor Compression Protocol may be enabled by the service mesh and/or service mesh control plane. Friendly Neighbor Compression protocols route data through trusted services of the service mesh within the same network and namespace as a microservice chain being invoked. These trusted services may be microservices and/or proxies having the same, similar and/or equivalent standards and/or security requirements as the services within the microservice chain requested to receive the data being sent. Trusted services intercalated into the microservice chain may be under-utilized services that have available computing resources to assist with compression of data on behalf of the microservice chain. The trusted service may receive the uncompressed data being routed by the service mesh from a microservice or a proxy of the microservice within the microservice chain, compress the data, and route the compressed data through the service mesh to the next microservice or proxy of the microservice chain, reducing the overall computing resource requirements of the microservice chain, while taking advantage of the underutilized computing resources of the trusted services to perform data compression.

Computing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1A illustrates a block diagram describing an embodiment of a computing system 100, which may be a simplified example of a computing device (i.e., a physical bare metal system and/or a virtual system) capable of performing the computing operations described herein. Computing system 100 may be representative of the one or more computing systems or devices implemented in accordance with the embodiments of the present disclosure and further described below in detail. It should be appreciated that FIG. 1A provides only an illustration of one implementation of a computing system 100 and does not imply any limitations regarding the environments in which different embodiments may be implemented. In general, the components illustrated in FIG. 1A may be representative of any electronic device, either physical or virtualized, capable of executing machine-readable program instructions.

Although FIG. 1A shows one example of a computing system 100, a computing system 100 may take many different forms, including bare metal computer systems, virtualized computer systems, container-oriented architecture, microservice-oriented architecture, etc. For example, computing system 100 can take the form of real or virtualized systems, including but not limited to desktop computer systems, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s), processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) can be loaded into persistent storage 116.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 1B:
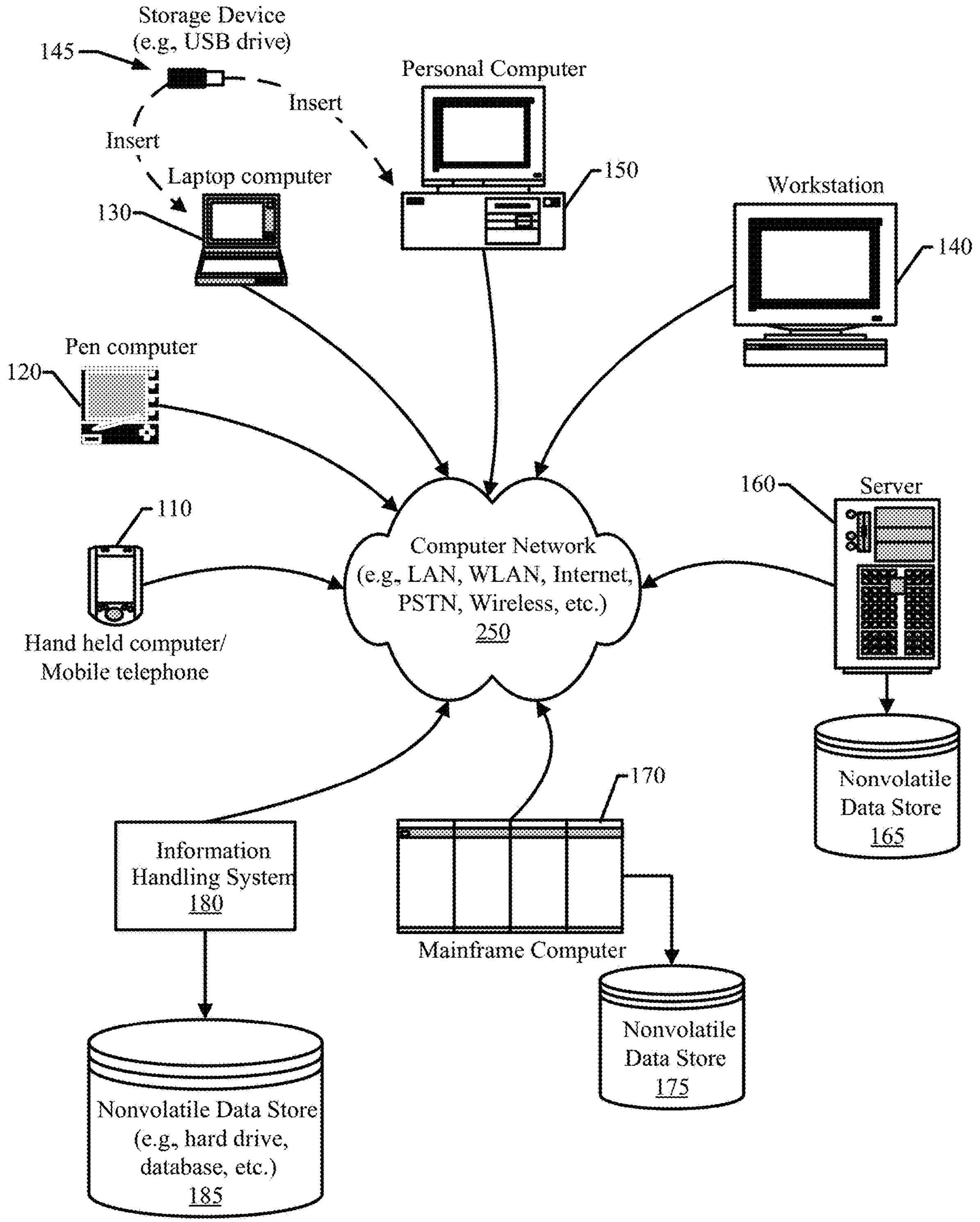
FIG. 1B depicts a block diagram illustrating an extension of the computing system environment of FIG. 1A, wherein the computing systems are configured to operate in a network environment and perform methods described herein in accordance with the present disclosure.

FIG. 1B provides an extension of the computing system 100 environment shown in FIG. 1A to illustrate that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet computer 120, laptop or notebook computer 130, workstation 140, personal computer system 150, and server 160. Other types of information handling systems that are not individually shown in FIG. 1B are represented by information handling system 180.

Many of the computing systems can include nonvolatile data stores, such as hard drives and/or nonvolatile memory. The embodiment of the information handling system shown in FIG. 1B includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems. In some embodiments, the network of computing systems 100 may utilize clustered computing and components acting as a single pool of seamless resources when accessed through network 250 by one or more computing systems. For example, such embodiments can be used in a datacenter, cloud computing network, storage area network (SAN), and network-attached storage (NAS) applications.

As shown, the various computing systems 100 can be networked together using computer network 250. Types of computer network 250 that can be used to interconnect the various information handling systems include Local Area Networks (LANs), Wireless Local Area Networks (WLANs), home area network (HAN), wide area network (WAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 100.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
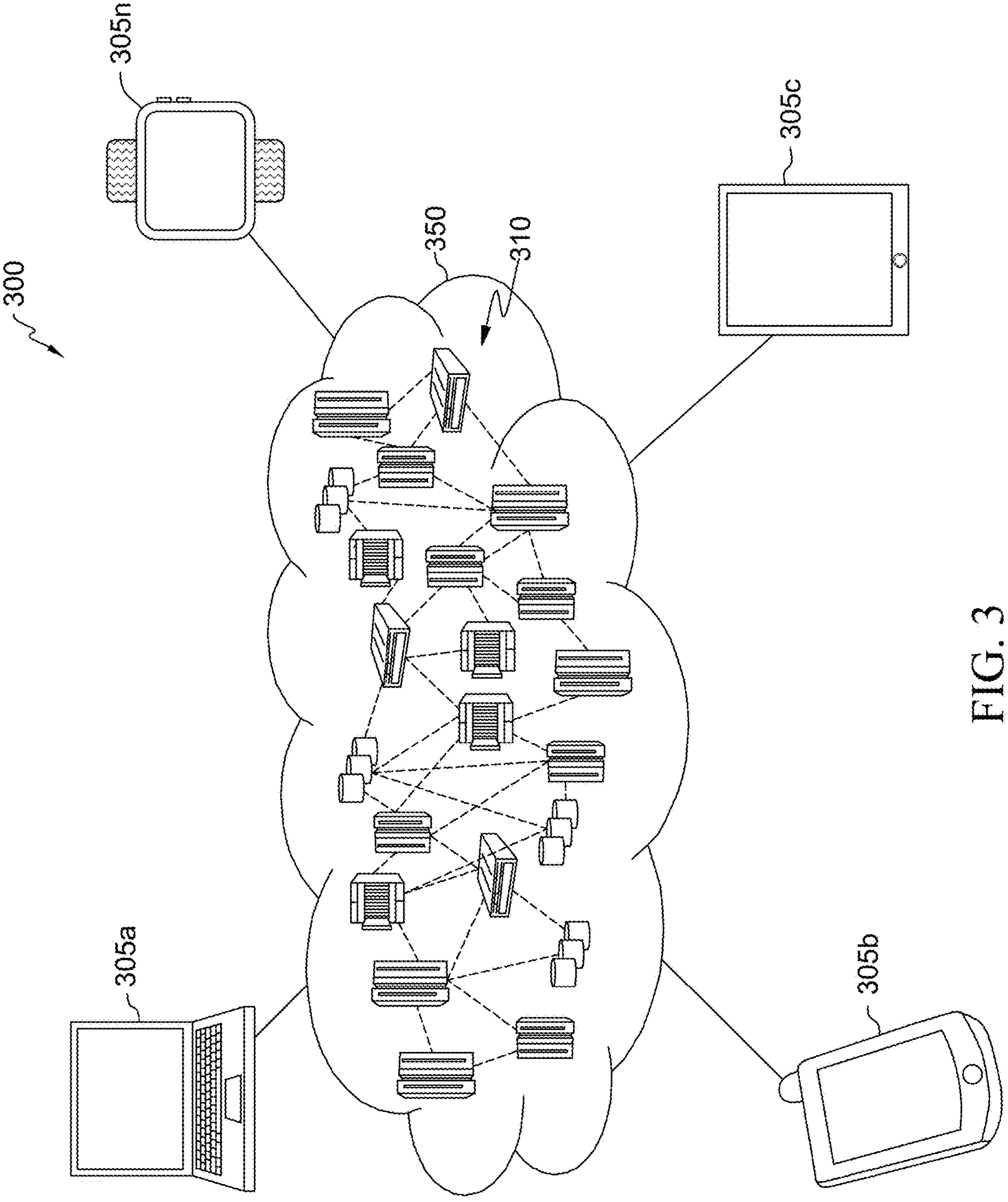
FIG. 3 depicts a block diagram illustrating a cloud computing environment in accordance with the present disclosure.

Referring to the drawings, FIG. 3 is an illustrative example of a cloud computing environment 300. As shown, cloud computing environment 300 includes a cloud network 350 comprising one or more cloud computing nodes 310 with which end user device(s) 305*a*-305*n* (referred to generally herein as end user device(s) 305) or client devices, may be used by cloud consumers to access one or more software products, services, applications, and/or workloads provided by cloud service providers or tenants of the cloud network 350. Examples of the user device(s) 305 are depicted and may include devices such as a desktop computer, laptop computer 305*a*, smartphone 305*b* or cellular telephone, tablet computers 305*c* and smart devices such as a smartwatch 305*n* and smart glasses. Nodes 310 may communicate with one another and may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of end user devices shown in FIG. 3 are intended to be illustrative only and that computing nodes 310 of cloud computing environment 300 can communicate with any type of computerized device over any type of network and/or network addressable connection (e.g., using a web browser).

Figure 4:
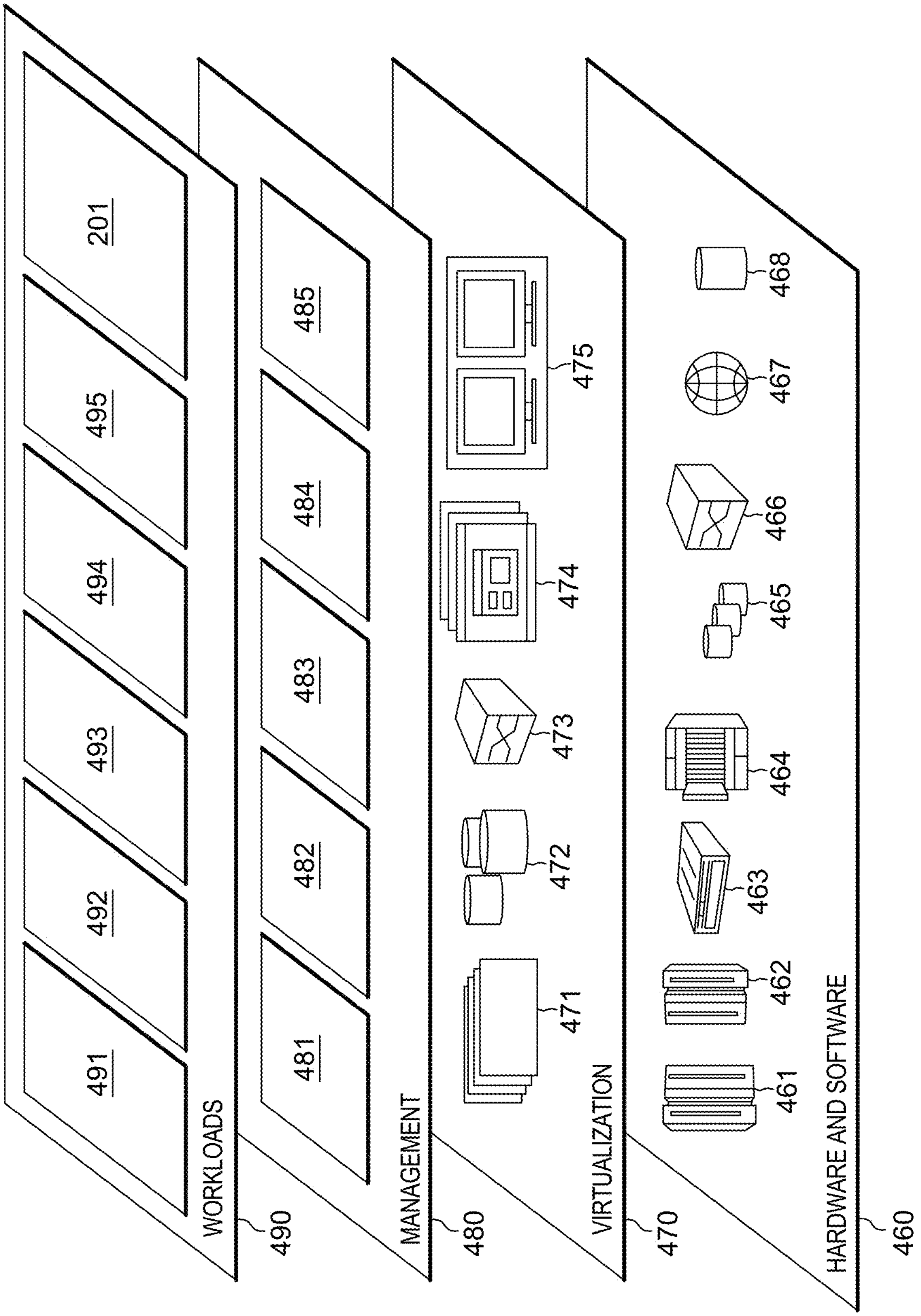
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

Management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include software development and lifecycle management 491, data analytics processing 492, multi-cloud management 493, transaction processing 494; database management 495 and application UI 201 for one or more application(s) 203.

System for Implementing a Service Mesh with Intelligent Data Compression

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 2:
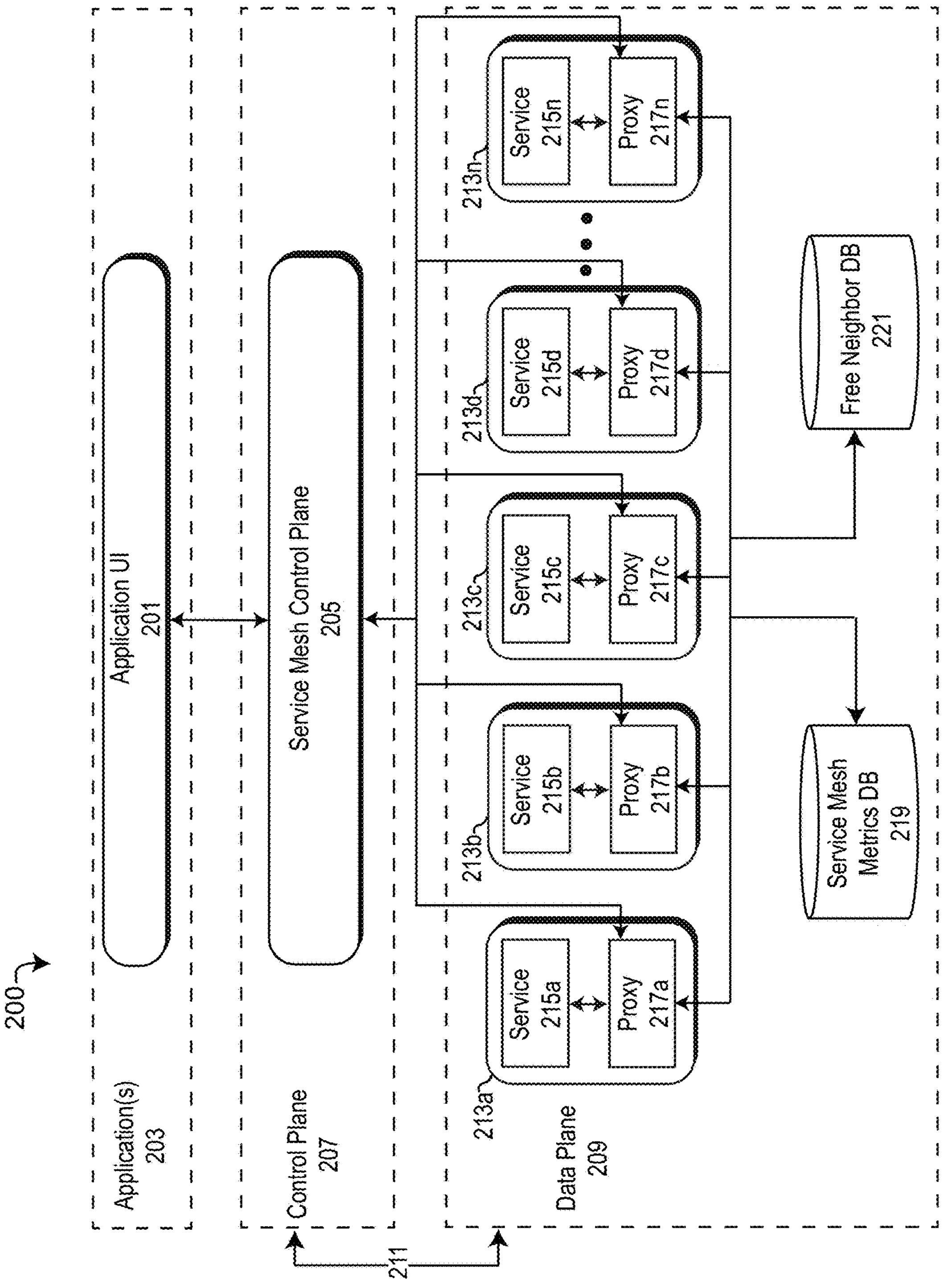
FIG. 2 depicts a functional block diagram describing an embodiment of a computing environment for implementing a service mesh with intelligent data compression, in accordance with the present disclosure.

Referring to the drawings, FIG. 2 depicts an embodiment of a computing environment 200 illustrating a microservice architecture that can be executed on one or more computing systems 100 and variations thereof. As illustrated in the embodiment of the computing environment 200 depicted in FIG. 2, a plurality of planes (or layers) of the environment are placed in communication with one another. As depicted, the computing environment 200 includes (but is not limited to) an application plane or layer comprising one or more application(s) 203, a control plane 207 and a data plane 209.

Embodiments of the application layer may be the layer of the network comprising one or more application(s) 203 and/or services that may make requests for network functions from the control plane 207 and/or data plane 209. The combination of the control plane 207 and the data plane 209 make up the service mesh 211. Users accessing the applications 203 of the application layer may input the requests for services and/or functions of the network by interacting with a user interface (UI) of the application 203. For example, the application UI 201 shown in FIG. 2. End user devices or client devices may request the services or functions from the planes of the service mesh 211 by inputting or transmitting requests via the application UI 201 to the service mesh control plane 205 of the network and/or to one or more microservices 215*a*-215*n* (generally referred to herein as microservices 215 or services 215). Embodiments of the application UI 201 may be part a mobile application, web application, SaaS application, etc. For example, mobile applications may be inputting requests and routing data through the service mesh 211 by transmitting an API call to an API gateway of the network. In other examples, clients may be using a command line interface (CLI) to input commands to the service mesh 211 of the data plane 209 and/or the service mesh control plane 205, and/or a web-based UI transmitting an HTTP request via a web browser.

In some embodiments, the application 203 accessing and inputting commands into the computing environment 200 may be a control plane UI being accessed by one or more administrators of the microservices 215. Administrators of the service mesh 211 may be able to obtain an overview of applications 203 running on the service mesh 211, including a view of applications on each cluster, create or modify computing resources of the service mesh 211; deploy instances 213*a*-213*n* of services 215 which may be instantiated as part of a pod, container or cluster; scale service mesh 211 deployments; instances 213 of service 215; restart pods or containers and/or deploy new applications or services 215.

Embodiments of the control plane 207 of the service mesh 211, may configure the data plane 209 based on a declared or desired state of the service mesh 211. The control plane 207 may be the portion or part of a network responsible for controlling how data packets are forwarded from a first location of the network to a destination of the network, and the route the data will take to arrive at the destination. A control plane 207 may be responsible for creating a routing table, routing rules, and implementing various protocols to identify the network paths that may be used by the network. The control plane 207 can store the network paths to the routing table. Examples of protocols used for creating routing tables may include Border Gateway Protocol (BGP), Open Shortest Path First (OSPF), and/or Intermediate System to Intermediate System (IS-IS).

Embodiments of the service mesh control plane 205, may provide rules, policies and/or configurations enacted for each of the running data planes 209 of a service mesh 211. The service mesh control plane 205 provide policy and configuration for all of the running data planes 209 in a service mesh 211 but does not touch any packets or requests transmitted by the users. Embodiments of the service mesh control plane 205 may turn all the data planes 209 into a distributed system. The service mesh 211 may be initially configured by a human administrator interacting with the service mesh control plane 205 via a UI to control the distributed system of the service mesh 211. For example, the administrator may interact with the service mesh control plane 205 through a web portal, CLI or some other interface. Through the UI, the operator or administrator may access global system configurations for the service mesh 211, including but not limited to, deployment control, authentication and authorization settings, route table specifications, and load balancer settings such as timeouts, retries, circuit breakers, etc.

Embodiments of the service mesh control plane 205, may further include additional components that configure the service mesh 211. For example, in some embodiments, the service mesh control plane 205 may further configure a workload scheduler, service discovery and sidecar proxy configuration APIs. The services 215 of the service mesh may run on infrastructure via a scheduling system (e.g., Kubernetes®), and the workload scheduler may be responsible for bootstrapping a service 215 along with a sidecar or proxy 217*a*-217*n* (referred to generally herein as proxy 217). As the workload scheduler starts and stops instances 213 of the services 215, the service discovery component may report the state of services and may be the process responsible for automatically finding instances 213 of services 215 to fulfill queries and requests. Embodiments of sidecar proxy configuration APIs may describe the configuration of the proxy 217 mediating inbound and outbound communication to the service 215 attached to the proxy 217. During configuration of the proxies 217, all proxies 217 may be programmed in the service mesh 211 with configuration settings that allow the proxy to reach every instance 213 and/or service 215 in the service mesh 211. Moreover, the sidecar proxy configuration APIs may configure the proxy to accept traffic on all ports associated with a service 215. Furthermore, through the sidecar proxy configuration APIs, the service mesh control plane 205 may fine tune the set of ports, and protocols that a proxy 217 may accept when forwarding traffic to and from an instance 213 or service 215. Additionally, through the sidecar proxy configuration APIs, the service mesh control plane 205 may restrict a set of services 215 that a proxy 217 may reach when forwarding outbound traffic from a service 215 or instance 213.

Embodiments of the service mesh control plane 205 may organize instances 213 (such as one or more pods, containers or clusters), services 215, and/or proxies 217 into one or more networks or namespaces. The service mesh control plane 205 may enroll a set of namespaces to a service mesh 211 and upon enrolling a namespace, the service mesh control plane 205 may enable monitoring of resources within the namespace, including the monitoring of any applications deployed as pods, services 215 or other types of instances 213, and traffic policies. Enrolling a namespace also optionally allows for metrics to be collected for resources in the given namespace and for instances 213 of pods or services 215 within the namespace to be automatically injected with proxy 217 containers.

Referring now to the data plane 209, embodiments of the data plane 209 may be responsible for touching every packet of data and/or request of the service mesh 211. In other words, the data plane 209 of the service mesh 211 may be responsible for conditionally translating, forwarding, and observing every network packet that flows to and from the instances 213 and services 215 of the service mesh 211. As illustrated in the exemplary embodiment, the data plane 209 may comprise a plurality of instances 213 such as one or more clusters, pods, or containers which may be running a service 215 within the instance 213. Embodiments of each service 215 may be co-located within an instance 213, with a sidecar network proxy 217. For example, as shown in FIG. 2, service 215*a* is co-located with proxy 217*a* within instance 213*a*; service 215*b* is co-located with proxy 217*b* within instance 213*b*; service 215*c* is co-located with proxy 217*c* within instance 213*c*; service 215*d* is co-located with proxy 217*d* within instance 213*d*; and the last service 215*n* is co-located with proxy 217*n* within instance 213*n* of the data plane 209. All network traffic (e.g., HTTP, REST, gRPC, Redis, etc.) from individual services 215 may flow via the local proxy 217 to a destination routed by the service 215, in accordance with the routing rules and policies of the service mesh 211. Since the data flows from the services 215 to the co-located proxy 217 and a second proxy 217 to finally reach a second service 215, the services 215 may not be aware of the network of services at large that may form the data plane 209. Instead, the services 215 themselves may only be aware of their local proxy 217.

Embodiments of the proxies 217 may be responsible for performing tasks associated with service discovery, health checking, routing, load balancing, authentication/authorization, and observability. Service discovery tasks may include discovery of upstream and/or backend services 215 and instances 213 that are available on the data plane 209 of the service mesh 211. Health checking tasks may include determining whether upstream services 215 or instances 213 returned by service discovery are healthy and ready to accept network traffic. Health checking may include both active health checking and/or passive health checking. Routing tasks include directing requests to a proper instance 213, cluster, pod or container of a service 215. For example, a REST request for a local instance 213 of a service 215, a proxy 217 tasked with sending an outbound communication to the next service 215 of a microservice chain knows where to send the communication based on the routing rules and configurations. Authentication and authorization tasks of the proxy 217 may include the proxy 217 performing cryptographic attestation of incoming requests to determine if the request being invoked by a user is valid and allowable. For example, the user sending the requested call is authenticated the proxy 217 using Mutual Transport Layer Security (mTLS) or another mechanism of authentication, and if the user is allowed to invoke the requested endpoint service of the service mesh 211, the proxy 217 may route the request to the next service 215 along the microservice chain. Otherwise, the proxy 217 can return an unauthenticated response to a user that is not authorized to invoke a particular call function or a user that is not authenticated by the service mesh 211.

Embodiments of the proxies 217 may perform one or more observability tasks of the service mesh 211. The observability tasks may include, for each request, the collection of detailed metrics of the service mesh 211, including statistics, logging, and generation of distributed tracing data that may allow operators and administrators of the service mesh 211 to understand the distributed traffic flow of the service mesh 211. Embodiments of the service mesh 211 may keep track of all possible services 215 being invoked by users. Embodiments of the service mesh 211 may track the invoked services 215 on a per user basis and store the data associated with the user's invoked services 215 to profiles associated with the users (i.e., user profiles). Over time, the service mesh 211 may build a heuristics database comprising metrics collected by the service mesh 211 via the proxy 217, as requests are made and fulfilled for users. In the exemplary embodiment of FIG. 2, the heuristics database collecting metrics of the service mesh 211 may be referred to as service mesh metrics database 219 (referred to herein on FIG. 2 as service mesh metrics DB 219).

Proxies 217 of the service mesh 211 may collect and store a plurality of different metrics to the service mesh metrics DB 219 over time, along with user profiles associated with the metrics being collected. For example the types of metrics being collected by the service mesh 211 may include the size of data being sent between services 215 of a microservice chain, on a per user profile basis; the size of data being sent by each user profile and the time of day the data is being sent; the amount of data being sent for each microservice chain within the service mesh 211 for all users and may further detail the data being sent to each microservice chain based on the time of day. In some embodiments of the service mesh 211, the service mesh 211 may further record metrics to the service mesh metrics DB 219 detailing the aggregate amount of network traffic during a day or a period of time, the expected amounts of network traffic within the service mesh 211 during the day or a period of time, and network traffic attributed to each user profile per day or over a period of time. For example, service mesh 211 may record the number of requests submitted by each user profile and/or the total number of requests submitted for each microservice chain of the service mesh 211.

Embodiments of the service mesh 211 may utilize the metrics collected by the service mesh metrics DB 219 to configure and apply intelligent compression to the data being sent through the service mesh 211 to one or more services 215 of a microservice chain in order to fulfill user requests. Intelligent compression by the service mesh 211 may be implemented in a variety of different ways. Each of the categories of intelligent compression may be implemented alone or in combination with one or more other types of intelligent compression. Examples of the types of intelligent compression that may be configured and utilized by the service mesh 211, may include intelligent compression implemented selectively on a per user profile basis, based on the type of usage by each user and the amount of data sent by users associated with the user's profile; intelligent compression based on the time of day that one or more users are submitting requests and/or the expected aggregate amount of traffic on the network; and/or Friendly Neighbor Compression protocol, whereby proxies 217 or services 215 that may have free computing resources but may otherwise be outside of the microservice chain being invoked by a request, may perform data compression instead of a more overly utilized proxy 217 or service 215 within the microservice chain being invoked.

Intelligent compression by service mesh 211 may be triggered to selectively apply data compression based on the user profile initiating a request for a service 215 being routed by the service mesh 211, the amount of data being routed through the microservices chain and/or the amount of data historically known or expected to be routed through the microservice chain by the user profile. Embodiments of the service mesh control plane 205 may configure a threshold level of data being routed and/or frequency of data being routed by each user profile. The threshold may be configured based on the collected metrics of each user profile as stored by the service mesh metrics DB 219. The service mesh 211 may set the threshold level for triggering the selective compression of the user profile. For example, based on the collected metrics, the configured threshold may be set based on anticipated amount of data being sent by user profiles via a microservice chain for each API call, the total aggregate amounts of data known to be transmitted via a microservice chain in a day by each user profile, etc. User profiles being tracked by the metrics of the service mesh 211 that send an amount of data over the configured thresholds, such as an amount of data in a single request over a configured threshold and/or over a configured threshold of an aggregate amount of data within a specified time frame, may be compressed by the proxy 217 of the services 215 of the microservice chain being invoked by the API call, while separate user profiles still operating under the configured threshold may not have data compressed for the same API call.

Figure 5:
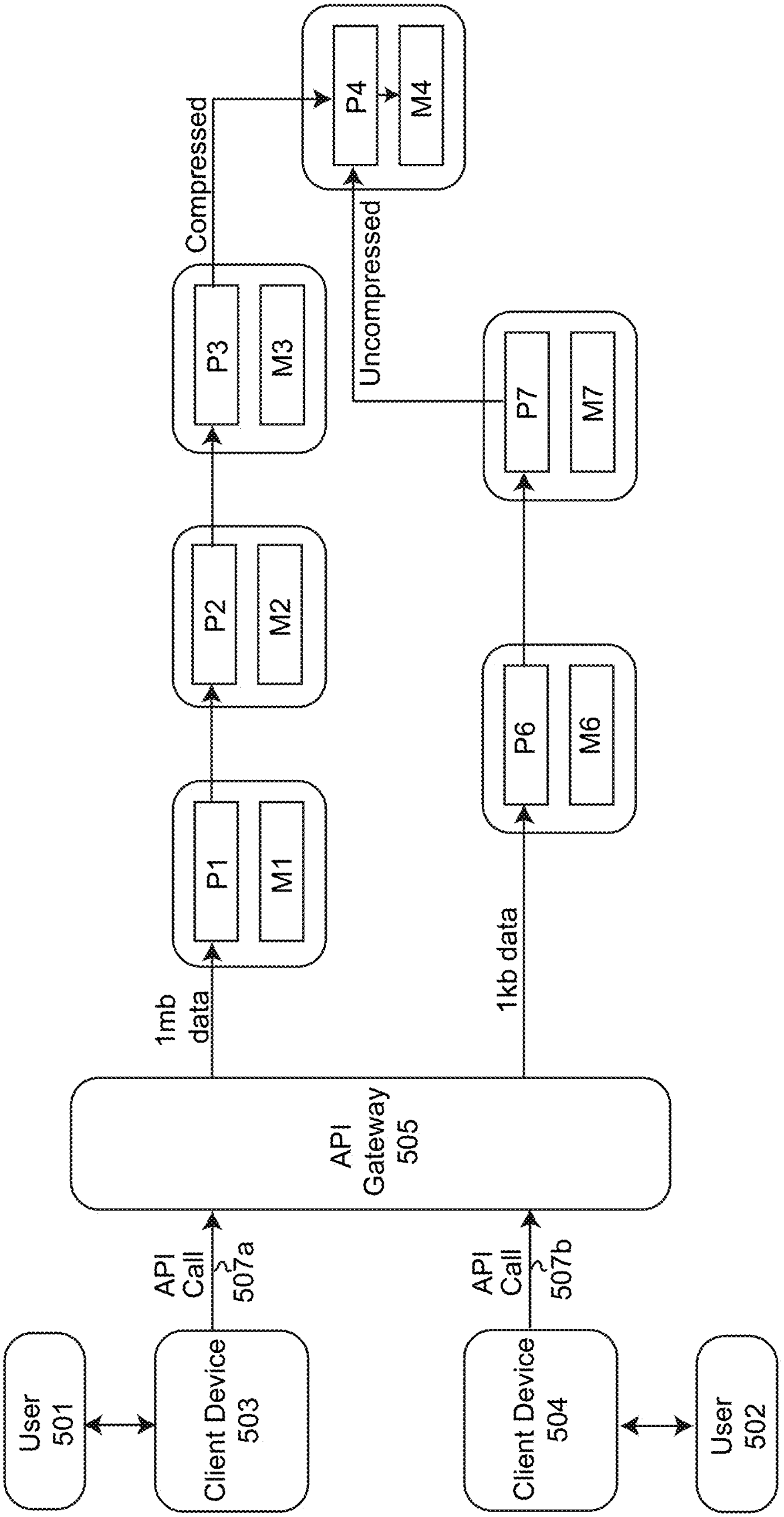
FIG. 5 depicts a block diagram illustrating an embodiment of a service mesh enabling intelligent compression in a microservice chain based on user profile and type of usage, in accordance with the present disclosure.

FIG. 5 depicts an example of intelligent compression by the service mesh 211 which is selectively applies compression to requests by specific user profiles, while selectively choosing not to apply compression for a second user profile based on historical metrics collected for each user profile stored within the service mesh metrics DB 219. As shown in FIG. 5, a first user 501 may regularly submit a first API call 507*a* via a client device 503 through an API gateway 505 for a microservice M4. As shown, the microservice chain for invoking the microservice M4 is routed through the proxies P1, P2, and P3 of microservice M1, M2, M3 before ultimately being sent to proxy P4 delivering the data to microservice M4. The first user 501 may regularly submit 1 mb of data or more with each API call 507*a*. Likewise, a second user 502 may invoke a same API call 507*b* to the API gateway 505 via client device 504. The second user may regularly submit 1 kb of data for each API Call 507*b* via the microservice chain routing the data to M4 via the proxies P6 to P7 to P4 of microservices M6, M7 and M4 respectively.

Based on the historical analysis of the transactions being regularly sent by the different users in this example, metrics may be known to the service mesh 211 for each user and the service mesh may set a threshold accordingly. For instance, a threshold of less than 1 mb of data may be the configured by the service mesh control plane 205 and an amount of data exceeding 999 kb may be compressed before reaching the endpoint of the microservice chain (M4 in this example). Knowing that based on historical metrics, user 501 submits requests at 1 mb or above using the microservice chain M1 to M2 to M3 to M4, the service mesh 211 may intelligently enable compression at proxy P3 of microservice M3, causing proxy P3 to compress the 1 mb of data before being routed by the service mesh 211 to M4. Moreover, knowing, based on the historical metrics collected by the service mesh 211, that the second user 502 regularly sends 1 kb of data using the microservice chain M6 to M7 to M4, a size of data below a configured threshold, the service mesh 211 may not enable compression at either M6, M7 or proxies thereof, allowing the uncompressed 1 kb of data to be routed through the service mesh 211, arriving at microservice M4 as uncompressed data.

In some embodiments of the service mesh 211, intelligent compression by service mesh 211 may be triggered to broadly enable compression for all services 215 and proxies 217 of the service thereof, sending data to a particular microservice based on expected aggregated traffic of the network. Based on analysis of the metrics collected by the service mesh metrics DB 219, the service mesh 211 may identify, based on historical requests and patterns of data being routed through the service mesh 211, the times of day and/or periods of time wherein there may be higher amounts of aggregate traffic to one or more services 215 of the service mesh 211. A time frame may be established by the service mesh 211, wherein data being transmitted during periods of time experiencing heavy amounts of network traffic through the service mesh 211 can be compressed for all users of the service mesh 211. For example, if there is a period of time in the morning, mid-day, afternoon, evening, etc., where the amount of aggregate network traffic is predicted to exceed a configured threshold established by one or more policies or rules of the service mesh control plane 205, compression may be enabled for the period of time when the expected heightened levels of traffic are predicted. For instance, where higher levels of traffic above the configured threshold are being routed to services 215 of the service mesh 211 between 8 am to 10 am, the service mesh 211 may enable compression to occur for all requests submitted between 8 am and 10 am, regardless of the user profile submitting the request. Outside of the 8 am to 10 am period of time, data may be routed through the service mesh uncompressed, and/or selectively compressed using another intelligent compression protocol described herein, such as based on user profile activity or the overall size of the data being sent.

Figure 6A:
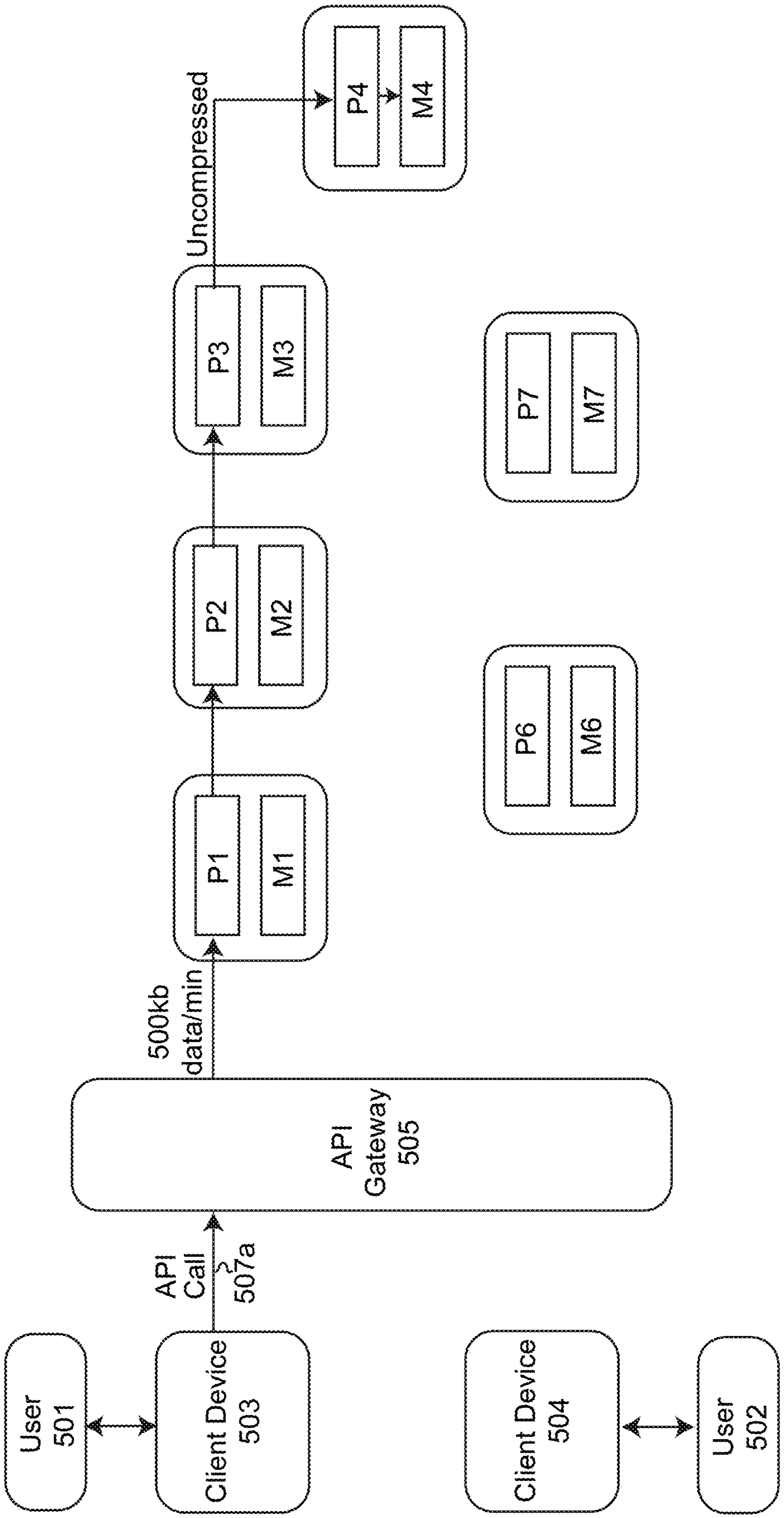
FIG. 6A depicts a block diagram illustrating an embodiment of a service mesh executing a microservice chain based on network traffic at a first point in time.
Figure 6B:
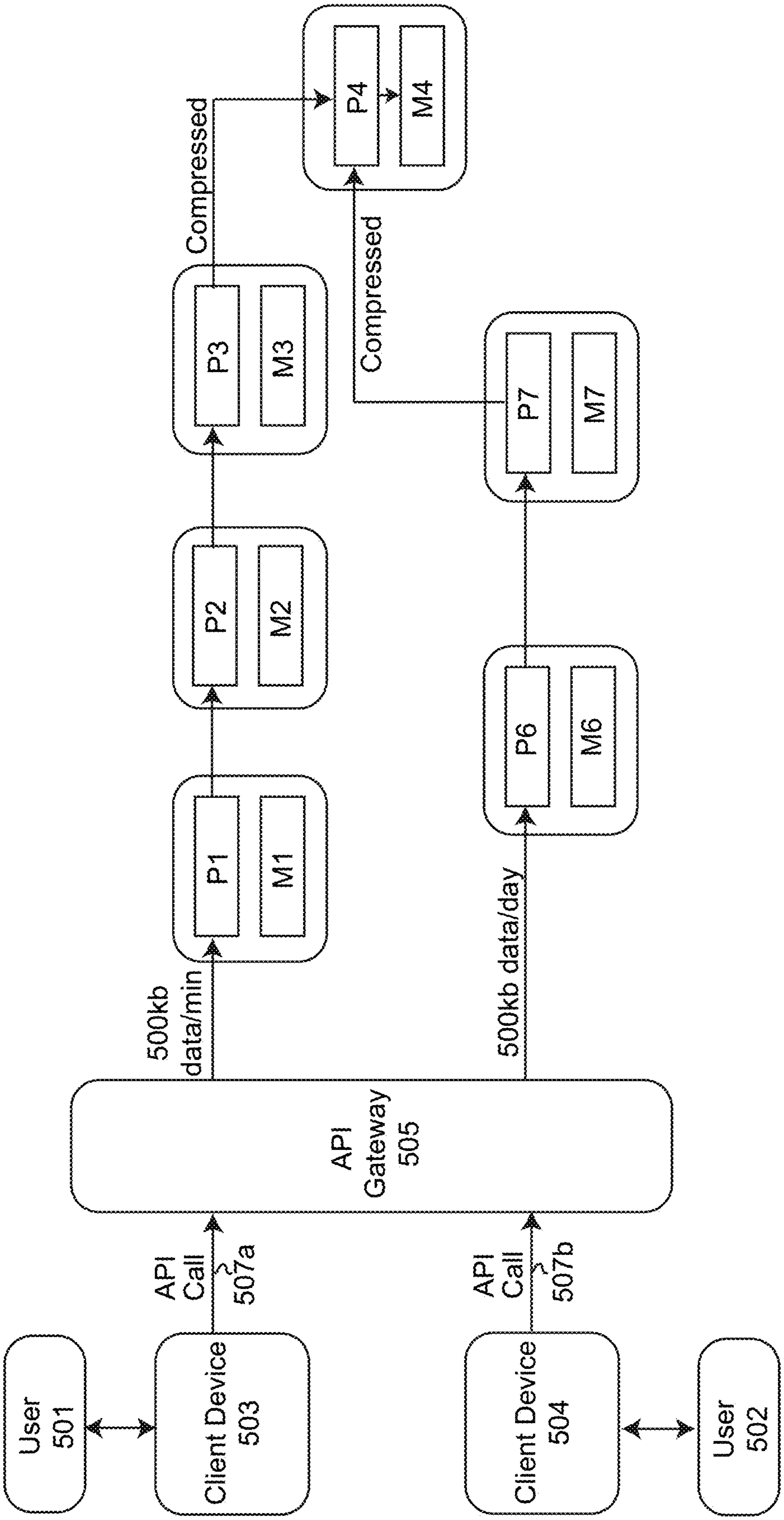
FIG. 6B depicts a block diagram illustrating an embodiment of the service mesh of FIG. 6A, at a second point in time enabling intelligent compression based on network traffic.

FIG. 6A and FIG. 6B depict an example embodiment of intelligently applying data compression broadly to the services 215 of the service mesh 211, based on the amount of network traffic predicted to be routed to the services 215 and/or proxies 217 thereof within a service mesh 211. The predictions of network traffic routed through service mesh 211 may be based on historical metrics collected by the service mesh 211 and periods of time identified by the service mesh 211 where historically, the size or amount of data being routed through the service mesh 211 is above a configured threshold, compression is enabled for all network traffic being routed through the service mesh. The threshold level can be configured manually by an administrator of the service mesh 211, or automatically based on an analysis of the collected metrics and the available computing resources needed to process the historical levels of data being routed through the service mesh throughout a period of time, in the aggregate and/or at one or more times having high volumes of network traffic.

As shown in FIG. 6A, a first user 501 historically submits a first API call 507*a* to an API gateway 505 via client device 503 to the service mesh. The API call 507*a* routes 500 kb of data per minute through the microservice chain to microservice M4. As shown, the data is routed through the proxies P1 to P2 to P3 to P4 of a microservice chain comprising M1, M2, M3 and M4 respectively. During the period of time shown in FIG. 6A, the total amount of data being sent every minute over the service mesh does not arise above a configured threshold level of data (e.g., less than 1 mb of data), and thus, when the service mesh is predicted to route an amount of data below the configured threshold level, the 500 kb of data being routed to microservice M4 is routed as uncompressed data as depicted in FIG. 6A.

FIG. 6B of this example, depicts a period of time, wherein the service mesh historically identifies, based on collected metrics, wherein network traffic may arise above a configured threshold (i.e., a threshold of 1 mb or higher in this instance). As API call 507*a* sends 500 kb of data every minute, there is a period of time during the day when API call 507*b*, submitted by second user 502 via client device 504, is historically expected to submit 500 kb per day through proxies P6 to P7 to P4 of a microservice chain comprising M6, M7 and M4. Embodiments of the service mesh may use the collected metrics of the service mesh to predict a time frame user 502 may route the additional 500 kb of data through the service mesh, overlapping in time with the 500 kb/min being sent by user 501. For example, if user 502 is typically known to route the 500 kb of data through the service mesh between 4:30 pm to 5 pm, causing a total aggregate of network traffic of 1 mb to be routed through the service mesh simultaneously to microservice M4 and 1 mb of data is above the configured threshold, then all data being routed through the service mesh to microservice M4 may be compressed between the time frame of 4:30 pm to 5 pm. As shown, each of the proxies (i.e., P7 and P3) responsible for routing data to the proxy P4 of the endpoint microservice M4, may compress the data during the period of time compression is enabled by the service mesh (i.e., 4:30 pm to 5 pm in this example). Moreover, after 5 pm, following the period of time the service mesh expects the heightened level of aggregate network traffic to subside, compression of data by proxies P3 and P7 may be disabled, thus continuing to allow data to be routed to M4 again in an uncompressed manner.

In some embodiments of the service mesh 211, the service mesh 211 may intelligently outsource compression of the data being routed through a microservice chain to a trusted neighboring proxy 217 or microservice 215 that is outside of the microservice chain using a Friendly Neighbor Compression protocol (FNCP). The FNCP allows a service mesh 211 to find microservices and proxies outside of the microservice chain, but within the same network or namespace, that are being underutilized or may have plenty of freely available resources to perform compression. Intelligently outsourcing compression to an underutilized neighboring service 215 or proxy 217, frees up resources within the microservice chain, allowing the microservice chain to route more data and reduce the possibility that resources may become unavailable, resulting in errors or the inability to process additional requests that may be submitted by users. When the FNCP is engaged, and a microservice chain is identified as needing to invest resources into performing compressions of data, the service mesh 211 may conduct a resource trend analysis. As part of the resource trend analysis, the service mesh 211 may track resource usage, such as memory graphs and CPU graphs to identify trends and/or patterns of usage and make predictions based on the trends whether or not high levels of resources or more resources than provisioned to the microservice chain will be needed to be consumed over time to meet demand by users.

Based upon the trend analysis, the service mesh 211 may seek out trusted services 215 or proxies 217 outside of the microservice chain (to assist with performing compressions of data. For example, when the trend analysis predicts high levels of resource consumption of the microservice chain, maxing out resource use and/or the trend indicates that higher levels of resources may be needed over time than may be provisioned to the services 215 of the microservice chain. As part of the FNCP, the service mesh 211 may query a free neighbor database 221 (referred to herein on FIG. 2 as free neighbor DB 221) tracking each of the neighboring services 215 and/or proxies 217 thereof in the namespace or network of microservices. The free neighbor DB 221 may also track the security and compliance standards of the neighboring services 215 and proxies 217 thereof. Allowing the service mesh 211 to select neighboring services and proxies to be integrated into the microservice chain in need of assistance that have the same (i.e., matching), similar or equivalent security and compliance standards. Moreover, metrics tracked by the service mesh metrics DB 219 and analysis tools for analyzing metrics of the neighboring services 215 and proxies 217 may be in communication with or integrated with the free neighbor DB 221, allowing the service mesh 211 to accurately predict which neighboring microservices and associated proxies may have freely available resources or may be underutilized at the present time of need by the service mesh 211. For example, a neighboring service 215 and proxy 217 may only run services late at night and are otherwise unused during the day when a microservice chain is deployed. During the daytime, the neighboring service and proxy may be considered available and underutilized and thus deployed by the service mesh 211 using FNCP to perform compression of data on behalf of the microservice chain during the day. Likewise, where the same neighboring service 215 and proxy 217 are utilized in the evening or overnight based on the collected metrics of the service mesh 211, the neighboring service may be unavailable to assist under the FNCP. Therefore, when implementing FNCP to find an underutilized neighboring service 215 and proxy in the evening or overnight, the service mesh 211 will not try to deploy the same neighboring service, but rather may find a different neighboring service that is underutilized or has free resources in the evening or overnight to assist the microservice chain with data compression.

The deployment of FNCP may require the service mesh to change or update rules with the service mesh control plane 205. Once a neighboring service and/or proxy is identified from the free neighbor DB that has available resources for performing data compression, and is confirmed by the service mesh 211 (e.g. the service mesh control plane 205) as having similar security and compliance standards as the other services in the microservice chain, the service mesh control plane 205 may add or update rules for routing inbound and outbound traffic of the microservice chain through the neighboring service being deployed. The service mesh 211 will put in place rules that will route data through a part of the microservice chain to the neighboring service and rules for members of the microservice chain to accept traffic coming from the neighboring service and treating the incoming traffic of the neighboring service the same as traffic coming from other members of the microservice chain invoked by the user's request.

Figure 7A:
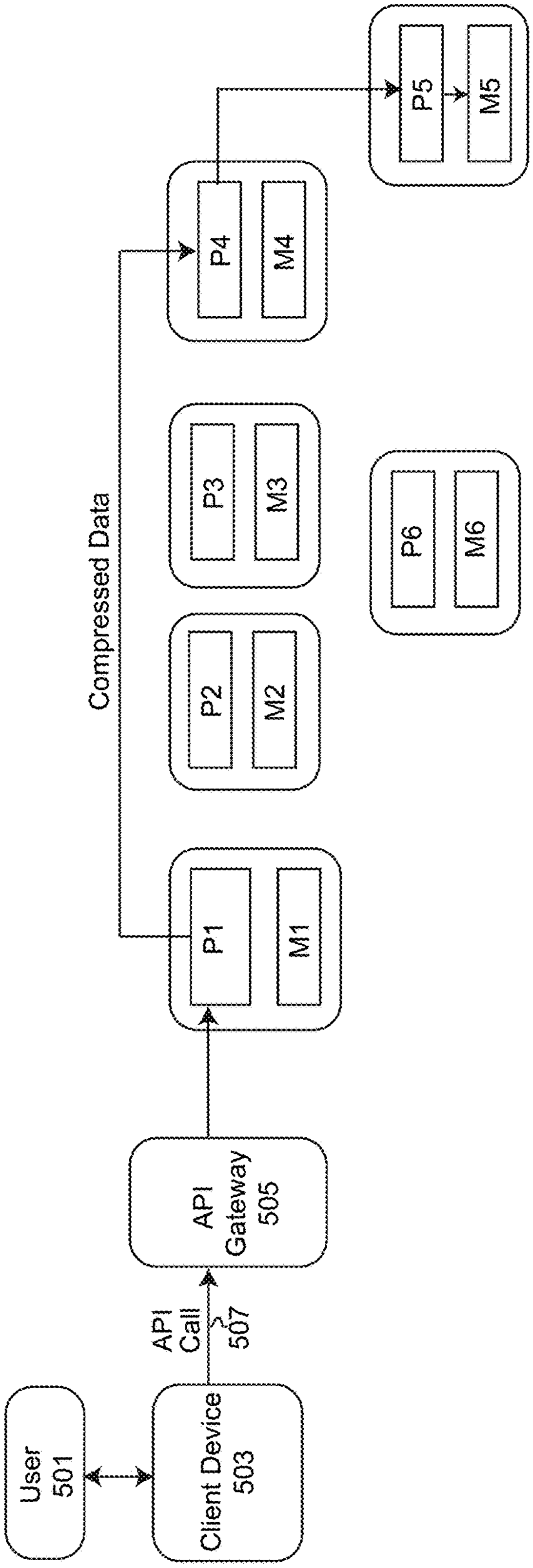
FIG. 7A depicts a block diagram illustrating a service mesh executing data compression in a microservice chain in accordance with the present disclosure.
Figure 7B:
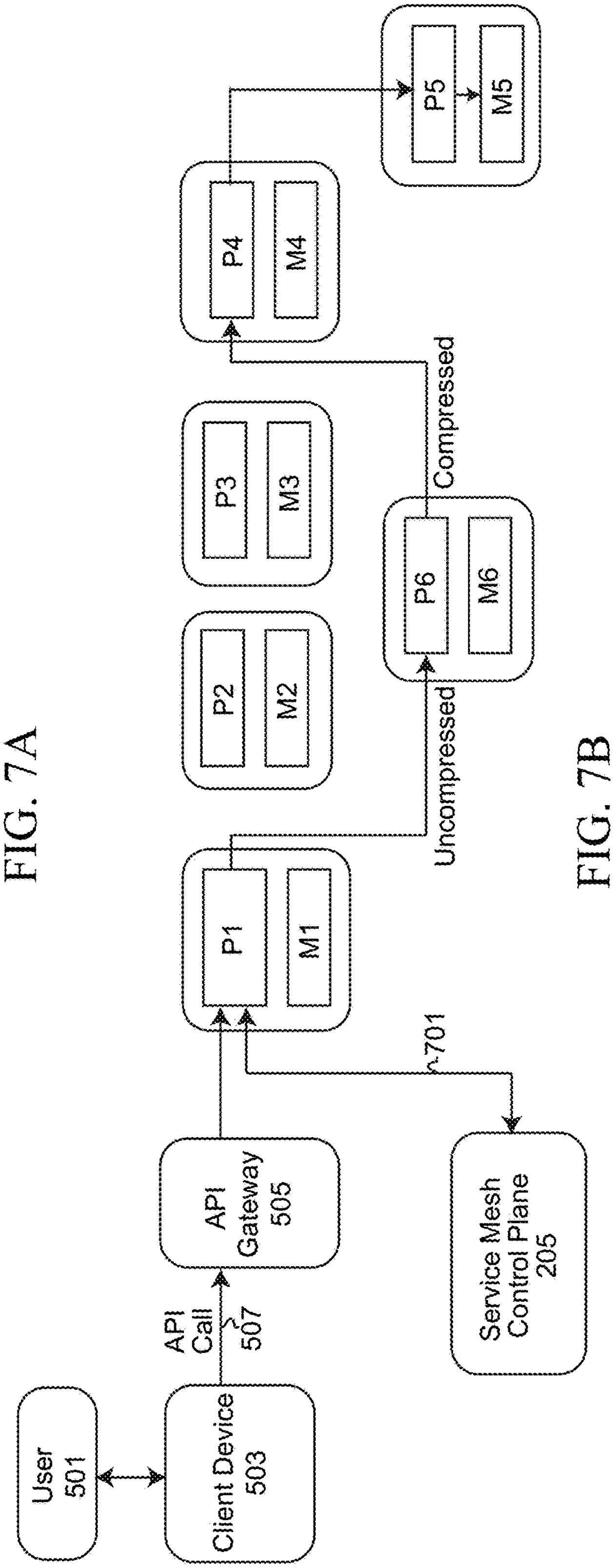
FIG. 7B depicts a block diagram illustrating the service mesh of FIG. 7A outsourcing compression of the data to a trusted neighboring microservice outside of an invoked microservice chain using a Friendly Neighbor Compression protocol, in accordance with the present disclosure.

FIGS. 7A and 7B illustrate an example of a microservice chain routing data to microservice M5 using the microservice chain alone, as shown in FIG. 7A, and using FNCP to employ a neighboring microservice M6 and the associated proxy P6 to perform data compression, as shown in FIG. 7B. As first shown in FIG. 7A, a user 501 submits an API call 507 to the API gateway 505 via the client device 503. The API call 507 routes the data to microservice M5 using a microservice chain M1 to M4 to M5, whereby the data is routed through proxies P1 to P4 to P5 respectively. The proxy P1 of the microservice chain compresses the data and routes the compressed data along the rest of the microservice chain.

In this example shown in FIG. 7A, the microservice M1 may need to send compressed data to M4 every minute. Upon performing an analysis trend, the service mesh 211 may find that the CPU and memory usage for M1 is too high and consuming too many resources. Microservice M1 may hit a capacity for resources within 30 minutes. The service mesh 211 may query the free neighbor DB 221 to find an underutilized microservice outside of the service chain being invoked by user 501. For instance, microservice M6 may only be processing data once per day, and otherwise may be sitting idle otherwise. Using FNCP, the service mesh 211 can check the security and compliance standards of microservice M6 via the service mesh control plane 205, as shown along route 701 of FIG. 7B. If the security and compliance standards of microservice M6 are the same, similar and/or equivalent to microservice M1, the service mesh control plane 205 can add or alter rules of the service mesh 211, wherein microservice M1 routes uncompressed data to microservice M6's proxy P6, instead of proxy P4. Proxy P6 will now perform compression of the data and route the compressed data back along the microservice chain to proxy P4 as shown in FIG. 7B. The rules of the service mesh 211 are additionally altered or updated such that proxy P4 accepts the compressed data from proxy P6, in the same manner as proxy P4 would have accepted the compressed data from Proxy P1 during the course of events of FIG. 7A. Proxy P4 routes the data along the rest of the microservice chain to proxy P5 and ultimately to the endpoint microservice M5.

Method for Implementing a Service Mesh with Intelligent Data Compression

The drawings of FIGS. 8-10B represent embodiments of methods for implementing a service mesh with intelligent data compression, as described in accordance with FIGS. 2-7B above, using one or more computing systems defined generically by computing system 100 of FIGS. 1A-1B; and more specifically by the embodiments of specialized computer systems depicted in FIGS. 2-7B and as described herein. A person skilled in the art should recognize that the steps of the method described in FIGS. 8-10B may be performed in a different order than presented and may not require all the steps described herein to be performed.

Figure 8:
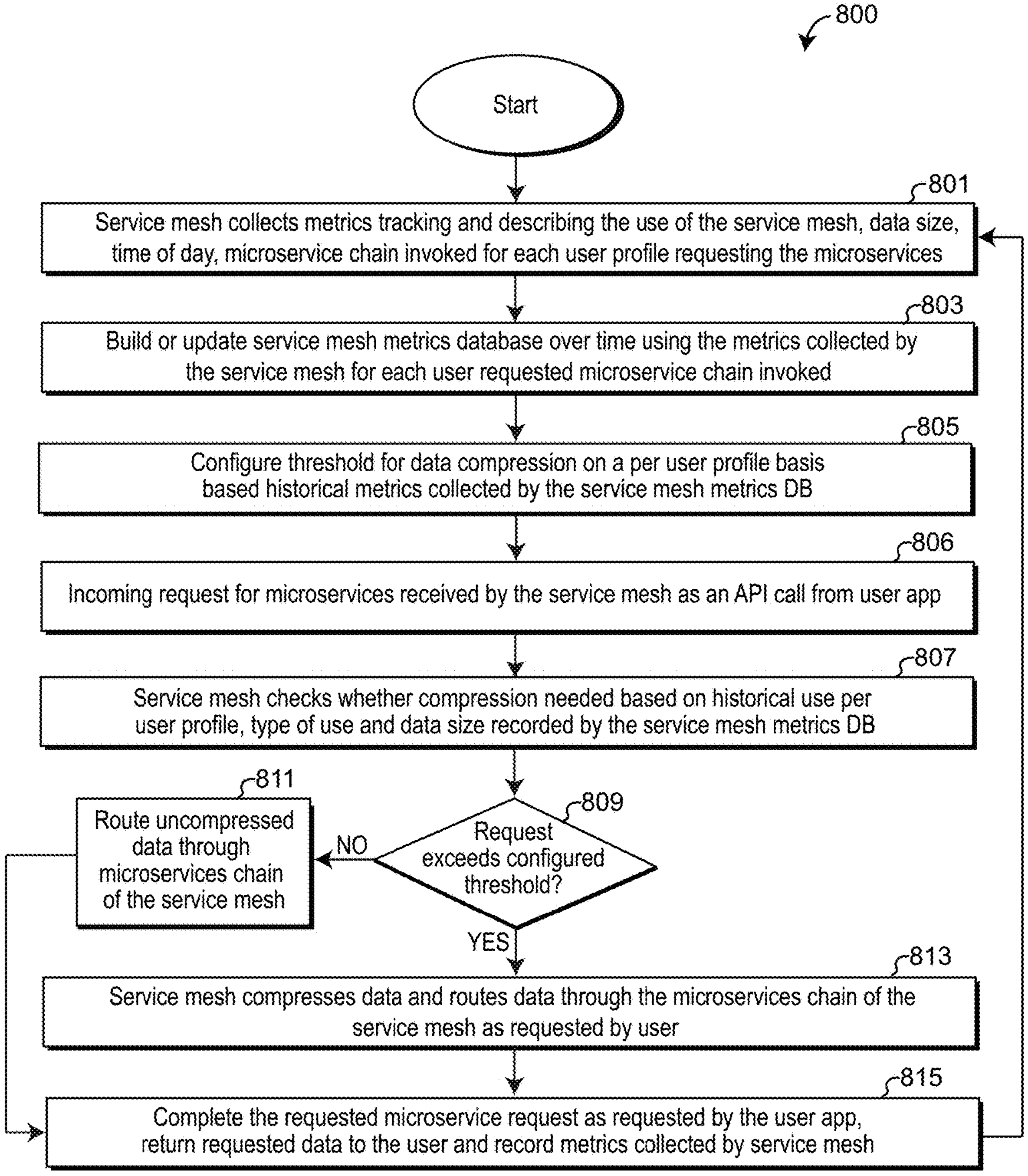
FIG. 8 depicts a flow diagram describing an embodiment of a method for implementing intelligent data compression by a service mesh based on type of usage and user profile, in accordance with the present disclosure.

FIG. 8 may refer to a method 800 for implementing a service mesh with intelligent data compression based on the type of usage and user profile to selectively compress data for particular user profiles sending requests or calls routed through the service mesh 211. The embodiment of the method 800 may begin at step 801. During step 801, the service mesh 211 collects metrics tracking and describing the use of the service mesh 211 over time. The metrics can include for each user profile sending a request, the data size being sent, time of day requests are sent and/or processed, the microservice chain invoked to complete the request, the number of requests for each user profile and the total number of requests for each microservice chain, and any other type of metrics that can be collected, stored and logged by a service mesh 211. In step 803, the service mesh 211 may build a heuristics database over time compiling the collected service mesh metrics into a service mesh metrics DB 219.

In step 805, the service mesh control plane 205 may configure rules, policies and a threshold level for data compression for data being routed through the service mesh 211. The service mesh control plane 205 may implement a threshold level for data compression on a per user profile basis, wherein data compression can be customized to each individual user profile known to use and consume resources of the service mesh 211. The threshold levels established in one or more rules or policies by the service mesh control plane 205 may be based on user profile metrics historically collected and stored by the service mesh metrics DB 219.

In step 806, an incoming request for microservices is received by the service mesh 211. For example, the incoming request for services may be in the form of an API call transmitted to the service mesh 211 by a user application. In step 807, the service mesh 211 may examine the incoming request for microservices received in step 806. The service mesh 211 may consult rules and policies for the service mesh 211 and determine using historical analysis whether or not compression is needed to fulfill the request, based on the user profile associated with the request, historical use per user profile, type of use and the data size recorded by the service mesh metrics DB 219. In step 809, based on the analysis of the incoming request, a determination is made by the service mesh 211 whether the request exceeds a configured threshold. For example, the user profile regularly routes large amounts of data through a microservice chain above a threshold size, compression may be applied based on service mesh rules and policies for user profile. If the request does not exceed a configured threshold for compressing the data, the method 800 proceeds to step 811, wherein the uncompressed data is routed through the microservices chain of the service mesh 211 as requested.

Alternatively, in a scenario where the service mesh 211 determines that the incoming request for microservices exceeds a configured threshold level associated with the service mesh rules, policies and/or user profile, the method may proceed to step 813, wherein the service mesh compresses the data and routes the compressed data through the microservice chain of the service mesh as requested by the user. In step 815, the request for microservices is completed as requested by the user application. Any data that may have been requested from the microservice may be returned to the user, and metrics for completing the request by the microservice chain can be recorded to the service mesh metrics DB 219.

Figure 9:
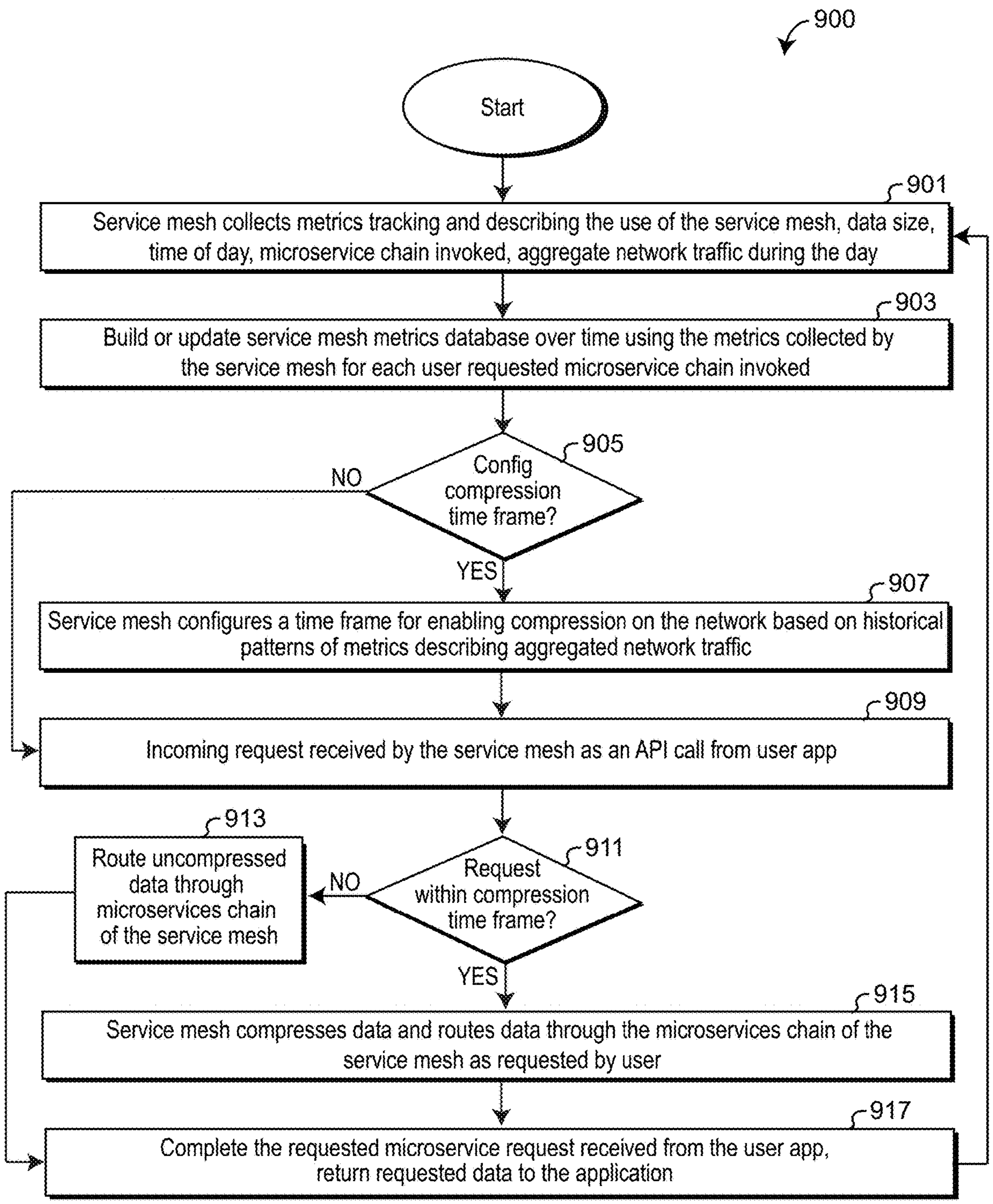
FIG. 9 depicts a flow diagram describing a method for implementing intelligent data compression by a service mesh based on daily aggregated network traffic, in accordance with the present disclosure.

FIG. 9 may refer to a method 900 for implementing a service mesh with intelligent data compression based on aggregate network traffic being routed through the service mesh 211 and varying enablement of compression based on the time of day or periods of time with high amounts of network traffic. In step 901, the service mesh 211 collects various metrics over time describing tracking the use and statistics of the service mesh 211 as the service mesh 211 functions to fulfill requests. For example, the service mesh 211 may collect metrics describing data size, time of day, the microservice chains invoked by requests, and/or aggregate network traffic at one or more points in time during the day. In step 903, the service mesh 211 may build or update a heuristics database such as a service mesh metrics DB 219 over time using the metrics collected by the service mesh 211. The service mesh 211 may collect metrics for each user requested microservice chain invoked to complete a request.

In step 905, the service mesh 211 may determine whether or not a time frame for compressing requests sent through the service mesh 211 in view of known or predicted levels of aggregate network traffic exceeding a configured threshold level. If the service mesh 211 determines that a time frame for compressing data routed through the service mesh is not needed or has already been configure and doesn't need to be updated further, the method 900 may proceed to step 909. Conversely where the service mesh 211 determines that a time frame for compressing data routed through the service mesh 211 should be configured and/or updated, the method may proceed to step 907. During step 907, the service mesh 211 configures and/or updates a time frame for enabling compression on the network for all requests being routed through microservice chains of the service mesh 211. The compression time frame may be identified based on the historical patterns of metrics collected by the service mesh describing the aggregate amount of traffic routed through the service mesh 211 and the time of day when requests are routed through the service mesh 211. The service mesh 211 identifies one or more periods of time where the aggregate amount of network traffic is predicted to exceed a configured threshold and establishes a period of time wherein requests arriving within one or more of the periods of time will send data through the service mesh 211 by compressing the data.

In step 909, the service mesh 211 receives an incoming request as an API call from one or more user applications. In step 911, the time of receiving the request is compared against one or more compression time frames. If the incoming request is not sent within an established compression time frame, the method 900 may proceed to step 913, wherein the data routed through the service mesh 211 is routed along the prescribed microservice chain as uncompressed data. Conversely, if the incoming request in step 909 is received by the service mesh 211 within a time frame established by the service mesh 211 to be a compression time frame, for example due to predicted high levels of aggregated network traffic, the method may proceed to step 915. In step 915 of method 900, the service mesh 211 compresses the data and routes the data through the microservice chain of the service mesh, as requested by the user via the incoming API call or other type of request. In step 917, the request for microservices is completed along with any data to be returned to the user application as part of fulfilling the request.

Figure 10A:
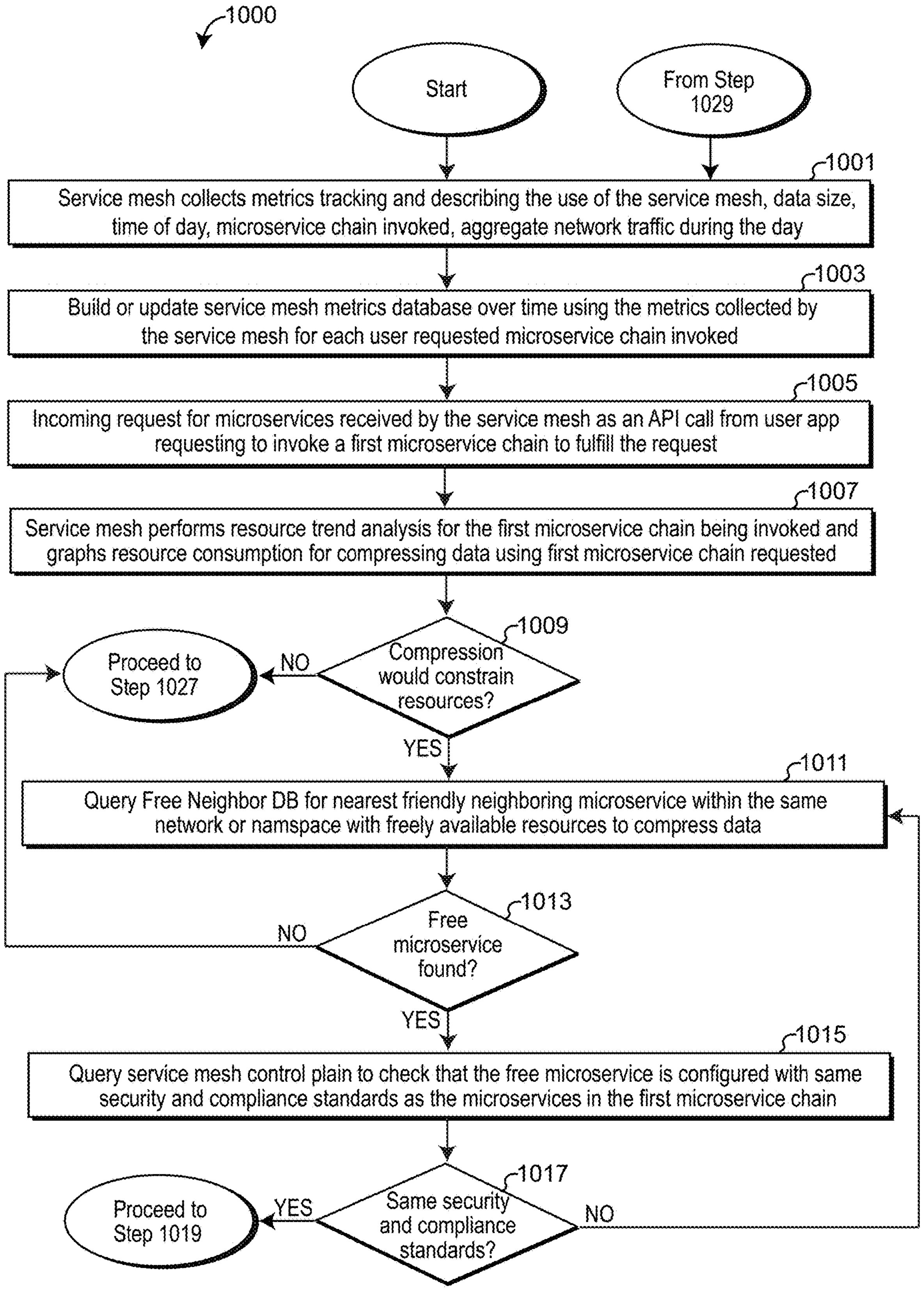
FIG. 10A depicts a flow diagram describing a method for implementing intelligent data compression by a service mesh using a Friendly Neighbor Compression Protocol to outsource compression to trusted neighboring microservices outside of an invoked microservice chain, in accordance with the present disclosure.
Figure 10B:
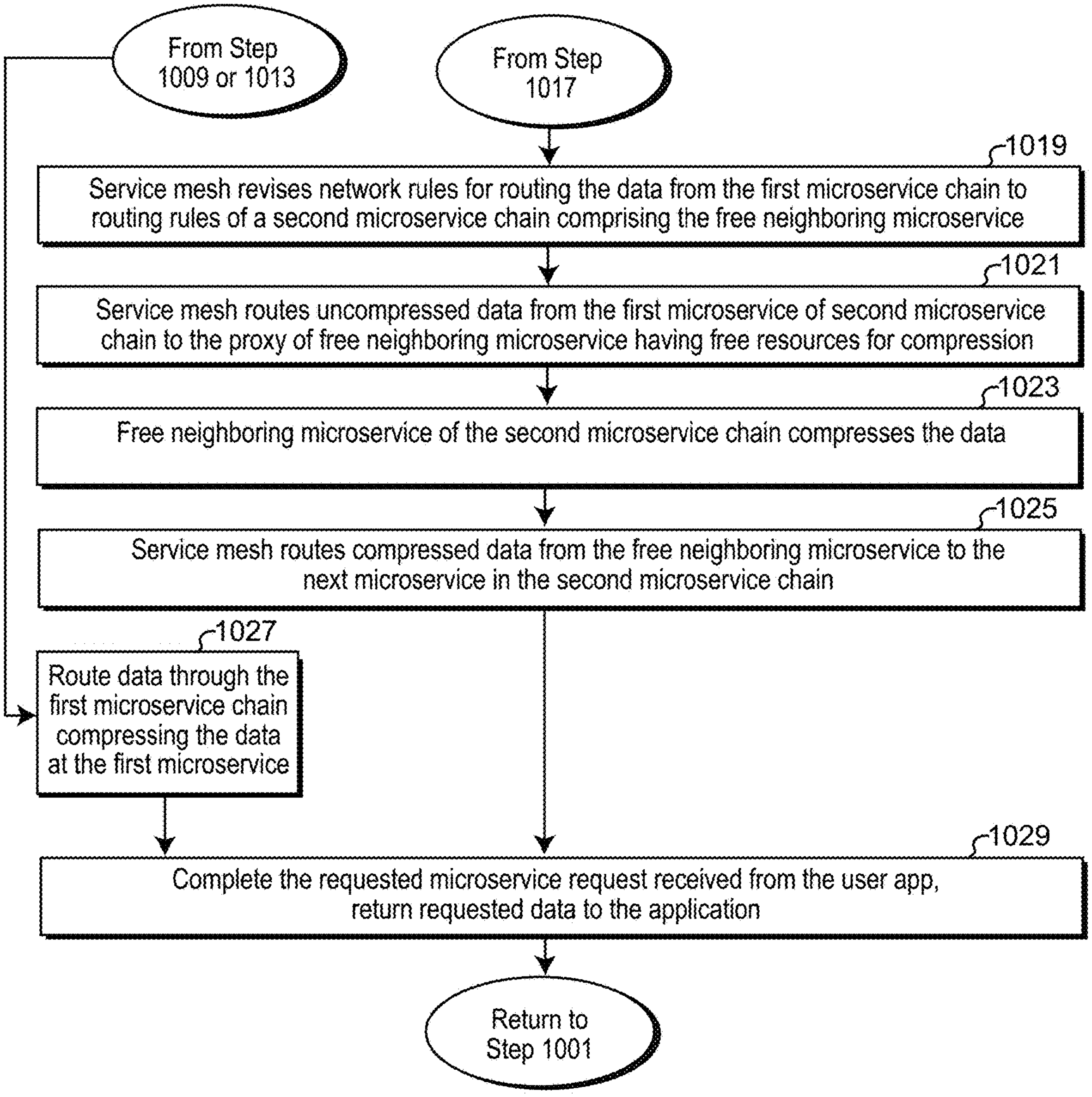
FIG. 10B is a continuation of the flow diagram of FIG. 10A, describing the method for implementing intelligent data compression by a service mesh using the Friendly Neighbor Compression Protocol to outsource compression to trusted neighboring microservices in accordance with the present disclosure.

FIGS. 10A-10B may refer to a method 1000 for implementing a service mesh with intelligent data compression using FNCP to find trusted, neighboring microservices within the same network or namespace that are outside of a microservice chain being invoked, but may be underutilized or have freely available resources able to provide data compression on behalf of the microservice chain being invoked. The method 1000 may begin at step 1001. During step 1001, the service mesh collects metrics tracking and/or describing the use of the service mesh, including statistics, logging, data size of transactions, the time-of-day requests occur, the microservice chains being invoked, aggregate network traffic, etc. In step 1003, the metrics collected by the service mesh 211 over time may be used to build or update a heuristics database, such as service mesh metrics DB 219.

In step 1005, an incoming request for microservices is received by the service mesh 211. For example, as an API call from a user application requesting to invoke a first microservice chain to fulfill the request. In step 1007, the service mesh 211 performs a resource trend analysis for the first microservice chain being invoked. Resource graphs describing memory, processing power and other computing resources consumed for routing, processing and/or compressing data being routed through the service mesh 211 may be generated using collected metrics made available by the service mesh metrics DB 219. Using the resource graphs and data describing consumption of resources by the services 215 of the microservices chain being invoked by the request, the service mesh may analyze and predict whether or not resources may be constrained or unavailable over time, to perform compression of data by the services 215 within the first microservice chain being invoked.

In step 1009, a determination is made whether fulfilling the request by compressing the data being routed through the first microservice chain would result in computing resources being constrained or unavailable over time to perform the requests and/or future requests. If compressing the data being routed through the first microservice chain would not cause a significantly negative impact the resources of the service mesh 211, the method 1000 may proceed to step 1027, whereby the service mesh 211 proceeds to route the data through the first microservices chain by compressing the data at the first microservice or proxy thereof. Likewise, where performing data compression by one or more services 215 within the microservice chain being invoked would constrain, limit or overutilize resources, the method may proceed to step 1011.

In step 1011, the service mesh 211 may query the free neighbor DB 221 for a nearest available friendly neighboring microservice and proxy thereof within the same network or namespace, having available resources to help compress data on behalf of the first microservice chain. In step 1013, a determination is made whether or not a free neighboring microservice is found. If there is not a free neighboring microservice that has available resources and/or is underutilized at the time of the request, the method 1000 may proceed to step 1027. Conversely, if a free neighboring microservice is found within the free neighbor DB 221 that meets the criteria for compressing data on behalf of the first microservice chain, the method may proceed to step 1015. In step 1015, a query is sent to the service mesh control plane 205 to check whether or not the free neighboring microservice identified in step 1011-1013 is configured with the same, substantially similar or equivalent security and compliance standards as the microservices within the first microservice chain. In step 1017, a determination is made whether the same, similar or equivalent standards are found for the free neighboring microservice. If the security and compliance standards are not satisfactory, the method 1000 may return to step 1011 and try to find another free neighboring microservice to assist with data compression. Likewise, if the free neighboring microservice is compliant with the security and compliance standards of the microservices within the first microservice chain, the method may proceed to step 1019.

In step 1019, the service mesh control plane 205 adds and/or revises network rules for routing data. The new or revised network rules may permit the routing of data via a second microservice chain, said microservice chain comprising the first microservice chain plus the free neighboring microservice identified by the free neighbor DB 221, wherein the microservices within the first microservice chain may route and/or accept data from the free neighboring microservice as if it were a member of the first microservice chain. In step 1021, the service mesh routes the uncompressed data from the first microservice of the microservice chain to the proxy of the free neighboring microservice having the free resources available to perform compression. In step 1023, the freely available microservice residing outside of the first microservice chain compresses the data and in step 1025, the service mesh 211 routes the compressed data from the free neighboring microservice (or proxy thereof) to the next microservice within the microservices chain. In step 1029, the request for microservices is complete and any requested data that may be required to be returned to the user application is sent to the user application.

What is claimed is:

1. A computer-implemented method comprising:

collecting, by a service mesh, service mesh metrics into a database that is tracking microservices of a service mesh being used for an application programming interface (API) call, and a size of data sent between microservices of one or more microservice chains, for a user profile submitting API calls to the service mesh;

performing, by the service mesh, a resource trend analysis of a first microservice chain using the database to identify resource availability of the microservices within the first microservice chain configured to compress data being routed by the service mesh in response to an incoming API call;

predicting, by the service mesh, resource constraints of a first microservice within the first microservice chain based on the resource trend analysis;

searching, by the service mesh, for a second microservice that resides outside of the first microservice chain, and wherein the second microservice has freely available resources to compress the data routed by the service mesh in response to the incoming API call;

querying, by the service mesh, a service mesh control plane for security and compliance standards of the second microservice;

determining, by the service mesh, the security and compliance standards of the second microservice match the security and compliance standards of the first microservice;

revising, by the service mesh, network rules for routing data from the first microservice of the first microservice chain to the second microservice; and routing, by the service mesh, uncompressed data of the incoming API call through the first microservice to the second microservice.

2. The computer-implemented method of claim 1, further comprising:

compressing, by the service mesh, the uncompressed data into compressed data at the second microservice.

3. The computer-implemented method of claim 1, wherein searching for the second microservice comprises:

querying, by the service mesh, a Free Neighbor Database comprising a plurality of microservices connected to the service mesh, for a nearest neighboring microservice to the first microservice residing outside of the first microservice chain.

4. The computer-implemented method of claim 1, wherein, revising the network rules includes a revised rule treating data received by a different microservice in the first microservice chain from the second microservice residing outside of the first microservice chain the same as receiving the data from the first microservice of the first microservice chain.

5. The computer-implemented method of claim 2, wherein routing the uncompressed data through the first microservice to the second microservice is performed by routing the uncompressed data through a proxy or sidecar of the first microservice to a proxy or sidecar of the second microservice; and compressing the uncompressed data into the compressed data is performed by the proxy or the sidecar of the second microservice.

6. A computer-implemented method comprising:

collecting, by a service mesh, service mesh metrics into a database that is tracking microservices of the service mesh being used for an application programming interface (API) call, a size of data sent between microservices of one or more microservice chains for a user profile submitting API calls to the service mesh, and a period of time an API call was performed by the service mesh routing data through the microservices of the service mesh;

configuring, by the service mesh, a threshold for compressing data routed between microservices of the service mesh, wherein the threshold is configured as a function of historical metrics of the database for the user profile and respective microservices of the service mesh;

receiving, by the service mesh, an API call requesting transmission of data to a microservice of the service mesh via a microservice chain;

identifying, by the service mesh, whether the transmission of the data to the microservice via the microservice chain triggers the threshold for compressing data, wherein the threshold is a period of time that an amount of aggregated network traffic of the service mesh is predicted to exceed a threshold level based on the service mesh metrics;

upon triggering the threshold for compressing data, compressing, by the service mesh, the data at a first microservice of the microservice chain; and routing, by the service mesh, data compressed by the first microservice of the microservice chain to a second microservice of the microservice chain.

7. The computer-implemented method of claim 6, wherein the API call requesting the transmission of the data via the microservice chain exceeds a data size configured as the threshold for the user profile submitting the API call.

8. The computer-implemented method of claim 7, further comprising:

upon the data size exceeding the threshold configured for the user profile transmitting the data via the microservice chain, selectively enabling, by the service mesh, compression of the data by the first microservice in the microservice chain, in response to the API call submitted by the user profile.

9. The computer-implemented method of claim 6, wherein during a time frame the aggregated network traffic of the service mesh is predicted to exceed the threshold level, all data routed through any of the microservices of the service mesh during the time frame is compressed.

10. The computer-implemented method of claim 9, further comprising:

wherein receiving the API call requesting transmission of the data to the microservice of the service mesh via the microservice chain occurs within the period of time, the first microservice compresses the data; and wherein receiving a second API call requesting a second transmission of data to the microservice of the service mesh via the microservice chain occurs outside the period of time where the aggregated network traffic is predicted to exceed the threshold level, routing, by the service mesh, data of the second API call from the first microservice to the second microservice as uncompressed data.

11. A computer-implemented method comprising:

collecting, by a service mesh, service mesh metrics into a database that is tracking microservices of the service mesh being used for an application programming interface (API) call, size of data sent between microservices of one or more microservice chains for a user profile submitting API calls to the service mesh, and a period of time an API call was performed by the service mesh routing data through the microservices of the service mesh;

configuring, by the service mesh, a threshold for compressing data routed between microservices of the service mesh, wherein the threshold is configured as a function of historical metrics of the database for the user profile and respective microservices of the service mesh;

receiving, by the service mesh, an API call requesting transmission of data to a microservice of the service mesh via a microservice chain, wherein a data size of the data exceeds the threshold for the user profile submitting the API call;

upon the data exceeding the threshold, selectively enabling, by the service mesh, compression of the data by a first microservice in the microservice chain, in response to the API call submitted by the user profile; and routing, by the service mesh, data compressed by the first microservice of the microservice chain to a second microservice of the microservice chain.

12. The computer-implemented method of claim 1, wherein the second microservice is within a same network as the first microservice chain.

13. The computer-implemented method of claim 1, wherein the second microservice is within a same namespace as the first microservice chain.

14. The computer-implemented method of claim 1, wherein the computer-implemented method is performed by the service mesh.

* * * * *